US010263691B2

(12) United States Patent
Rajagopalan et al.

(10) Patent No.: US 10,263,691 B2
(45) Date of Patent: Apr. 16, 2019

(54) DYNAMIC REVERSE LINK RETRANSMISSION TIMELINES IN SATELLITE COMMUNICATION SYSTEMS

(71) Applicant: QUALCOMM Incorporated, San Diego, CA (US)

(72) Inventors: Venkatraman Rajagopalan, San Diego, CA (US); Jelena Damnjanovic, Del Mar, CA (US); Qiang Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 46 days.

(21) Appl. No.: 15/271,750

(22) Filed: Sep. 21, 2016

(65) Prior Publication Data

US 2018/0083694 A1    Mar. 22, 2018

(51) Int. Cl.
| | | |
|---|---|---|
| H04B 7/185 | (2006.01) | |
| H04L 1/18 | (2006.01) | |
| H04B 7/195 | (2006.01) | |
| H04W 56/00 | (2009.01) | |

(52) U.S. Cl.
CPC ..... *H04B 7/18513* (2013.01); *H04B 7/18519* (2013.01); *H04B 7/18541* (2013.01); *H04L 1/1812* (2013.01); *H04L 1/1816* (2013.01); *H04B 7/195* (2013.01); *H04W 56/005* (2013.01); *H04W 56/0065* (2013.01)

(58) Field of Classification Search
USPC ........................................................ 455/12.1
See application file for complete search history.

(56) References Cited

U.S. PATENT DOCUMENTS

| | | | | |
|---|---|---|---|---|
| 6,934,255 B1* | 8/2005 | Toporek | ............. | H04B 7/18589 370/235 |
| 7,440,427 B1* | 10/2008 | Katz | ...................... | H04B 7/212 370/321 |
| 7,827,459 B1* | 11/2010 | Zhou | ..................... | H04L 1/1671 714/749 |
| 8,064,824 B2* | 11/2011 | Karabinis | .......... | H04B 7/18534 348/607 |

(Continued)

FOREIGN PATENT DOCUMENTS

| | | |
|---|---|---|
| CN | 102231908 A | 11/2011 |
| CN | 103001752 B | 6/2015 |

(Continued)

OTHER PUBLICATIONS

International Search Report and Written Opinion—PCT/US2017/047439—ISA/EPO—Nov. 20, 2017.

*Primary Examiner* — Lana N Le
(74) *Attorney, Agent, or Firm* — Paradice and Li LLP

(57) ABSTRACT

A method and apparatus for operating a satellite access network (SAN) of a satellite communication system to schedule communications with a user terminal. In some aspects, the SAN may provision a communication frame, for the user terminal, into a number of forward-link (FL) subframes and a different number of reverse-link (RL) subframes. The SAN then transmits the FL subframes to the user terminal via a forward link of the satellite communication system, and subsequently receives the RL subframes from the user terminal via a reverse link of the satellite communication system.

27 Claims, 18 Drawing Sheets

(56) References Cited

U.S. PATENT DOCUMENTS

| | | | |
|---|---|---|---|
| 8,665,729 B2* | 3/2014 | Cheng | H04L 1/1825 370/241 |
| 2004/0192201 A1* | 9/2004 | Febvre | H04B 7/2125 455/13.2 |
| 2005/0026621 A1* | 2/2005 | Febvre | H04B 7/18539 455/450 |
| 2005/0276249 A1* | 12/2005 | Damnjanovic | H04L 1/1841 370/335 |
| 2008/0115007 A1* | 5/2008 | Jalali | H04B 7/18536 714/1 |
| 2009/0170427 A1* | 7/2009 | Karabinis | H04B 7/1851 455/12.1 |
| 2009/0290534 A1* | 11/2009 | Connors | H04B 7/18582 370/319 |
| 2010/0309874 A1* | 12/2010 | Sahara | H04L 1/0003 370/329 |
| 2013/0016686 A1* | 1/2013 | Li | H04L 1/1822 370/329 |
| 2014/0362832 A1* | 12/2014 | Rudolf | H04L 1/1822 370/336 |
| 2015/0271730 A1 | 9/2015 | Benammar et al. | |
| 2016/0143035 A1* | 5/2016 | Xue | H04L 5/001 370/329 |
| 2016/0183234 A1* | 6/2016 | Sung | H04W 72/046 370/329 |
| 2016/0233950 A1* | 8/2016 | Chuberre | H04B 7/18578 |
| 2016/0278033 A1* | 9/2016 | Wu | H04B 7/18502 455/11.1 |
| 2017/0005741 A1* | 1/2017 | Wu | H04B 17/364 455/12.1 |
| 2017/0222713 A1* | 8/2017 | Damnjanovic | H04B 7/18582 |
| 2018/0176656 A1* | 6/2018 | Baudoin | H04B 7/18513 |

FOREIGN PATENT DOCUMENTS

| | | |
|---|---|---|
| EP | 0194920 A1 | 9/1986 |
| EP | 1021002 A1 | 7/2000 |
| EP | 1035666 A2 | 9/2000 |

* cited by examiner

DYNAMIC REVERSE LINK RETRANSMISSION TIMELINES IN SATELLITE COMMUNICATION SYSTEMS

INTRODUCTION

Various aspects described herein relate to satellite communications, and more particularly to dynamically adjusting reverse-link retransmission timelines in a satellite communication system.

Conventional satellite-based communication systems include gateways and one or more satellites to relay communication signals between the gateways and one or more user terminals. A gateway is an Earth station having an antenna for transmitting signals to, and receiving signals from, communication satellites. A gateway provides communication links, using satellites, for connecting a user terminal to other user terminals or users of other communication systems, such as a public switched telephone network, the internet and various public and/or private networks. A satellite is an orbiting receiver and repeater used to relay information.

A satellite can receive signals from and transmit signals to a user terminal provided the user terminal is within the "footprint" of the satellite. The footprint of a satellite is the geographic region on the surface of the Earth within the range of signals of the satellite. The footprint is usually geographically divided into "beams," through the use of one or more antennas. Each beam covers a particular geographic region within the footprint. Beams may be directed so that more than one beam from the same satellite covers the same specific geographic region.

Geosynchronous satellites have long been used for communications. A geosynchronous satellite is stationary relative to a given location on the Earth, and thus there is little timing shift and frequency shift in radio signal propagation between a communication transceiver on the Earth and the geosynchronous satellite. However, GSO satellite-based communications have relatively large round-trip delays (~500 ms) and tend to incur relatively high levels of attenuation. Moreover, because geosynchronous satellites are limited to a geosynchronous orbit (GSO), the number of satellites that may be placed in the GSO is limited. As alternatives to geosynchronous satellites, communication systems which utilize a constellation of satellites in non-geosynchronous orbits (NGSO), such as low-earth orbits (LEO), have been devised to provide communication coverage to the entire Earth or at least large parts of the Earth.

Compared to GSO satellite-based and terrestrial communication systems, non-geosynchronous satellite-based systems, such as LEO satellite-based systems, may present several challenges. For example, because LEO satellites move quickly across the sky relative to a given point on the earth's surface, beams transmitted from a LEO satellite may pass relatively quickly across a user terminal (UT) and/or gateway (GW). As a result, the GW and/or UT may experience changes in signal propagation delay when communicating via a LEO satellite. This may affect a timing at which communications between the GW and the UT are scheduled to occur. For example, hybrid automatic repeat request (HARQ) is a method by which a receiving device may request retransmission of data that was received in error. More specifically, HARQ allows for buffering and combining of incorrectly received data (e.g., packets, frames, PDUs, MPDUs, etc.) to potentially reduce the number of retransmissions needed to properly reconstruct a particular unit of data. Reverse-link HARQ processes (e.g., for communications from UT to GW) are typically synchronous, and thus depend on accurate timing of communications to be properly carried out.

A satellite access network (SAN) (e.g., a network of gateways, controllers, and other elements that communicate with the UT via satellite) may request retransmission of any portion of data that was received in error by sending a retransmission request to the UT that originally transmitted the data. Upon receiving a retransmission request, the UT may then determine the data to be retransmitted based on a preconfigured timeline or schedule. For example, the UT may adhere to a HARQ round-trip time (RTT) (e.g., duration between an initial data transmission and a subsequent retransmission of that data) when processing retransmission requests. Based on the RTT, and the time at which a particular retransmission request is received, the UT may determine the corresponding time at which the original data transmission occurred (e.g., and thus the data to be retransmitted).

As described above, changes in signal propagation delay may alter the timing of communications between the SAN and the UT. However, because reverse-link HARQ processes are synchronous, the UT must typically implement a fixed HARQ RTT to properly align a retransmission request with a corresponding subframe of data. This may cause unnecessarily long latencies in the processing of retransmissions. Thus, it may be desirable to dynamically adjust the timeline for processing retransmissions based on changes in signal propagation times.

SUMMARY

Aspects of the disclosure are directed to apparatuses and methods for reducing a latency of communications in a satellite communication system. In one example, a method of operating a satellite access network (SAN) is disclosed. The method may include receiving reverse-link (RL) data from a user terminal via a satellite of the satellite communication system, requesting retransmission, for the user terminal, of at least a portion of the RL data, and dynamically configuring a timeline for processing the retransmission based at least in part on a feeder-link delay between the SAN and the satellite.

In another example, a satellite access network is disclosed. The SAN may include one or more processors and a memory configured to store instructions. Execution of the instructions by the one or more processors may cause the SAN to receive RL data from a user terminal via a satellite of a satellite communication system, request retransmission, from the user terminal, of at least a portion of the RL data, and dynamically configure a timeline for processing the retransmission based at least in part on a feeder-link delay between the SAN and the satellite.

In another example, a satellite access network is disclosed. The SAN may include means for receiving RL data from a user terminal via a satellite of a satellite communication system, means for requesting a retransmission, from the user terminal, of at least a portion of the RL data, and means for dynamically configuring a timeline for processing the retransmission based at least in part on a feeder-link delay between the SAN and the satellite.

In another example, a non-transitory computer-readable medium is disclosed. The non-transitory computer-readable medium may store instructions that, when executed by one or more processors of a SAN, cause the SAN to perform operations that may include receiving RL data from a user terminal via a satellite of a satellite communication system, requesting retransmission, from the user terminal, of at least a portion of the RL data, and dynamically configuring a timeline for processing the retransmission based at least in part on a feeder-link delay.

BRIEF DESCRIPTION OF THE DRAWINGS

Aspects of this disclosure are illustrated by way of example and are not intended to be limited by the figures of the accompanying drawings.

DETAILED DESCRIPTION

Figure 1:
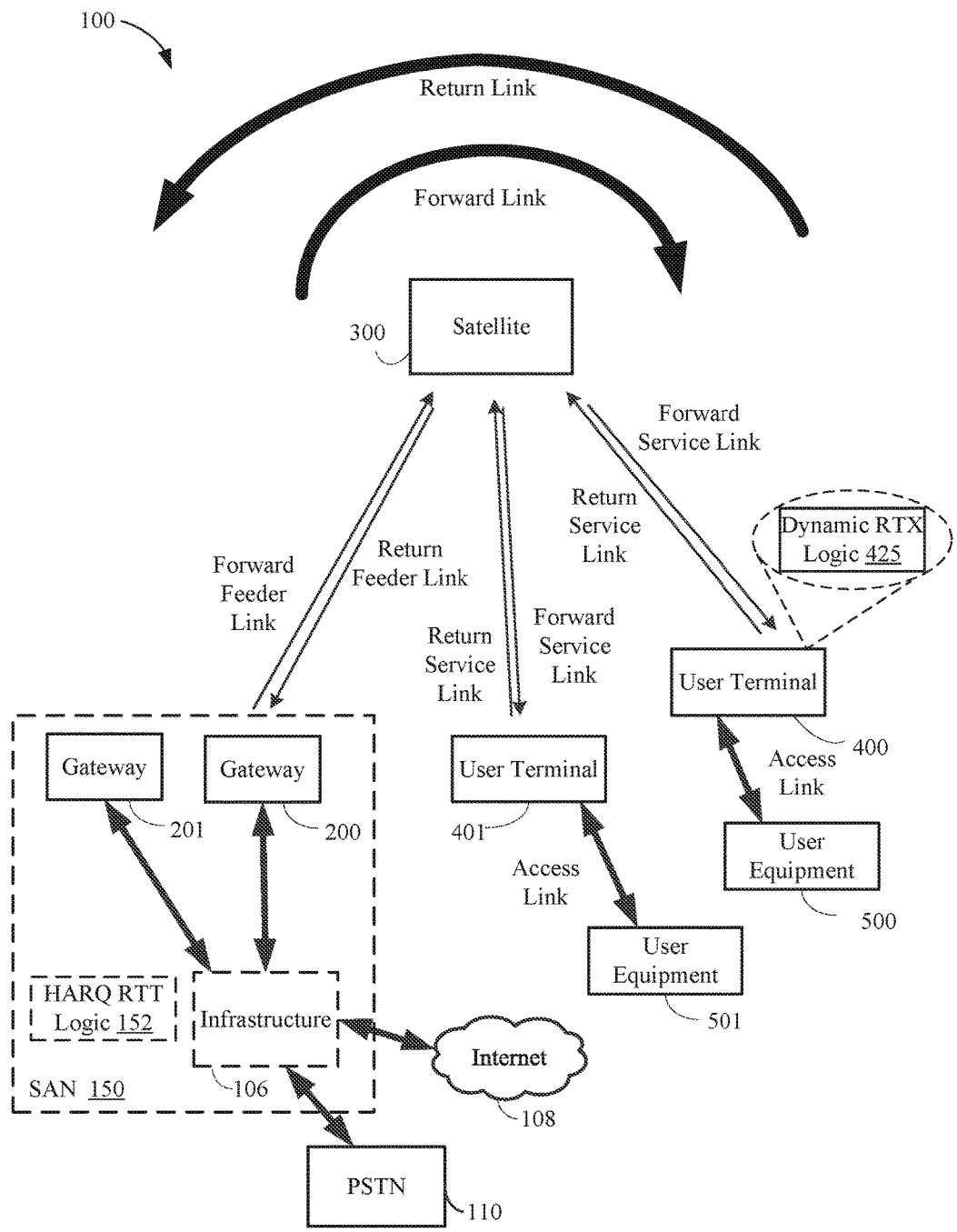
FIG. 1 shows a block diagram of an example communication system.

The example implementations described herein may reduce a latency of communications in a satellite communication system by dynamically adjusting a timeline for processing retransmissions (e.g., of reverse-link data) from a user terminal to a satellite access network (SAN). For example, the SAN may receive reverse-link (RL) data from a user terminal via a satellite of a satellite communication system. The SAN may further send a retransmission request, to the user terminal, for any portion of the RL data that was not correctly received. Due to movements of the satellite, the user terminal may receive the retransmission request with varying amounts of feeder-link delay (e.g., signal propagation delay between the SAN and the satellite). Thus, in at least one implementation, the SAN may communicate timing information to the user terminal based on the feeder-link delay. The user terminal may then use the received timing information to identify the RL data associated with the retransmission request (e.g., the data to be retransmitted to the SAN). In this manner, the SAN and UT may dynamically reduce the latencies of RL HARQ processes when the actual feeder-link delay is below a threshold (e.g., maximum or presumed) amount.

Aspects of the disclosure are described in the following description and related drawings directed to specific examples. Alternate examples may be devised without departing from the scope of the disclosure. Additionally, well-known elements will not be described in detail or will be omitted so as not to obscure the relevant details of the disclosure.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Further, many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the various aspects of the present disclosure. In other instances, well-known circuits and devices are shown in block diagram form to avoid obscuring the present disclosure. The various aspects of the present disclosure are not to be construed as limited to specific examples described herein but rather to include within their scopes all implementations defined by the appended claims.

FIG. 1 illustrates an example of a satellite communication system 100 which includes a plurality of satellites (although only one satellite 300 is shown for clarity of illustration) in non-geosynchronous orbits, for example, low-earth orbits (LEO), a satellite access network (SAN) 150 in communication with the satellite 300, a plurality of user terminals (UTs) 400 and 401 in communication with the satellite 300, and a plurality of user equipment (UE) 500 and 501 in communication with the UTs 400 and 401, respectively. Each UE 500 or 501 may be a user device such as a mobile device, a telephone, a smartphone, a tablet, a laptop computer, a computer, a wearable device, a smart watch, an audiovisual device, or any device including the capability to communicate with a UT. Additionally, the UE 500 and/or UE 501 may be a device (e.g., access point, small cell, etc.) that is used to communicate to one or more end user devices. In the example illustrated in FIG. 1, the UT 400 and the UE 500 communicate with each other via a bidirectional access link (having a forward access link and return access link), and similarly, the UT 401 and the UE 501 communicate with each other via another bidirectional access link. In another implementation, one or more additional UE (not shown) may be configured to receive only and therefore communicate with a UT only using a forward access link. In another implementation, one or more additional UE (not shown) may also communicate with UT 400 or UT 401. Alternatively, a UT and a corresponding UE may be integral parts of a single physical device, such as a mobile telephone with an integral satellite transceiver and an antenna for communicating directly with a satellite, for example.

The UT 400 may include dynamic retransmission (RTX) logic 425 that may enable the UT 400 to dynamically synchronize retransmission requests, received from a satellite access network (e.g., SAN 150), with RL HARQ processes maintained by the UT 400. More specifically, the dynamic RTX logic 425 may allow the UT 400 to identify previously-transmitted data associated with the retransmission requests based at least in part on timing information received from the SAN, for example, as described in more detail with respect to FIGS. 7-15. In some aspects, the timing information may include a timeline or round-trip time (RTT) for timing and/or scheduling the retransmission. In other aspects, the timing information may include a HARQ process identifier for the RL HARQ process associated with the requested data (e.g., to be retransmitted). Thereafter, the UT 400 may retransmit the requested data to the SAN in accordance with a dynamically-configured timeline.

The SAN 150 may include gateways 200 and 201, infrastructure 106, and additional elements or components (not shown for simplicity) for communicating with one or more user terminals 400 and/or 401 (e.g., via satellite 300) of the satellite communication system 100. The gateway 200 may have access to the Internet 108 or one or more other types of public, semiprivate or private networks. In the example illustrated in FIG. 1, the gateway 200 is in communication with infrastructure 106, which is capable of accessing the Internet 108 or one or more other types of public, semiprivate or private networks. The gateway 200 may also be coupled to various types of communication backhaul, including, for example, landline networks such as optical fiber networks or public switched telephone networks (PSTN) 110. Further, in alternative implementations, the gateway 200 may interface to the Internet 108, PSTN 110, or one or more other types of public, semiprivate or private networks without using infrastructure 106. Still further, gateway 200 may communicate with other gateways, such as gateway 201 through the infrastructure 106 or alternatively may be configured to communicate to gateway 201 without using infrastructure 106. Infrastructure 106 may include, in whole or part, a network control center (NCC), a satellite control center (SCC), a wired and/or wireless core network and/or any other components or systems used to facilitate operation of and/or communication with the satellite communication system 100.

The SAN 150 may include HARQ RTT logic 152 that may enable the SAN 150 to dynamically configure a timeline for carrying out RL HARQ operations with a corresponding user terminal (e.g., UT 400). More specifically, the HARQ RTT logic 152 may allow the SAN 150 to dynamically adjust a timeline for processing retransmissions of RL data based at least in part on a feeder-link delay between the SAN 150 and a satellite (e.g., satellite 300) used for communicating with the corresponding user terminal, for example, as described in more detail below with respect to FIGS. 7-15. The SAN 150 may communicate timing information associated with the adjusted timeline to the user terminal. In some aspects, the timing information may be provided in radio resource control (RRC) configuration messages sent during inter-beam handovers. In other aspects, the timing information may be provided in RL grant messages sent with individual retransmission requests.

Communications between the satellite 300 and the gateway 200 in both directions are called feeder links, whereas communications between the satellite and each of the UTs 400 and 401 in both directions are called service links. A signal path from the satellite 300 to a ground station, which may be the gateway 200 or one of the UTs 400 and 401, may be generically called a downlink. A signal path from a ground station to the satellite 300 may be generically called an uplink. Additionally, as illustrated, signals can have a general directionality such as a forward link and a return link or reverse link. Accordingly, a communication link in a direction originating from the gateway 200 and terminating at the UT 400 through the satellite 300 is called a forward link, whereas a communication link in a direction originating from the UT 400 and terminating at the gateway 200 through the satellite 300 is called a return link or reverse link. As such, the signal path from the gateway 200 to the satellite 300 is labeled "Forward Feeder Link" whereas the signal path from the satellite 300 to the gateway 200 is labeled "Return Feeder Link" in FIG. 1. In a similar manner, the signal path from each UT 400 or 401 to the satellite 300 is labeled "Return Service Link" whereas the signal path from the satellite 300 to each UT 400 or 401 is labeled "Forward Service Link" in FIG. 1.

Figure 2:
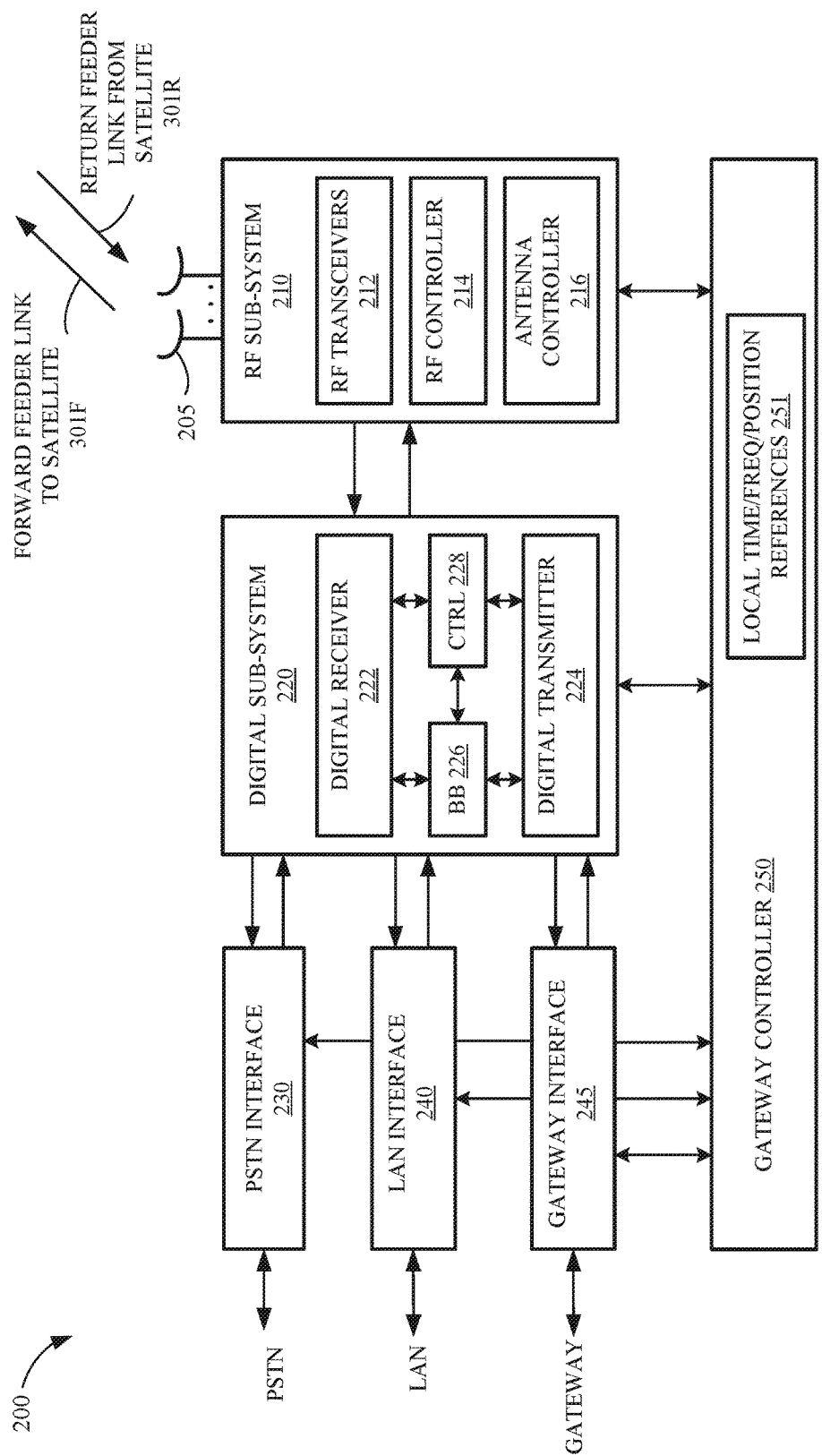
FIG. 2 shows a block diagram of one example of the gateway of FIG. 1.

FIG. 2 is an example block diagram of gateway 200, which also can apply to gateway 201 of FIG. 1. Gateway 200 is shown to include a number of antennas 205, an RF subsystem 210, a digital subsystem 220, a Public Switched Telephone Network (PSTN) interface 230, a Local Area Network (LAN) interface 240, a gateway interface 245, and a gateway controller 250. RF subsystem 210 is coupled to antennas 205 and to digital subsystem 220. Digital subsystem 220 is coupled to PSTN interface 230, to LAN interface 240, and to gateway interface 245. Gateway controller 250 is coupled to RF subsystem 210, digital subsystem 220, PSTN interface 230, LAN interface 240, and gateway interface 245.

RF subsystem 210, which may include a number of RF transceivers 212, an RF controller 214, and an antenna controller 216, may transmit communication signals to satellite 300 via a forward feeder link 301F, and may receive communication signals from satellite 300 via a return feeder link 301R. Although not shown for simplicity, each of the RF transceivers 212 may include a transmit chain and a receive chain. Each receive chain may include a low noise amplifier (LNA) and a down-converter (e.g., a mixer) to amplify and down-convert, respectively, received communication signals in a well-known manner. In addition, each receive chain may include an analog-to-digital converter (ADC) to convert the received communication signals from analog signals to digital signals (e.g., for processing by digital subsystem 220). Each transmit chain may include an up-converter (e.g., a mixer) and a power amplifier (PA) to up-convert and amplify, respectively, communication signals to be transmitted to satellite 300 in a well-known manner. In addition, each transmit chain may include a digital-to-analog converter (DAC) to convert the digital signals received from digital subsystem 220 to analog signals to be transmitted to satellite 300.

The RF controller 214 may be used to control various aspects of the number of RF transceivers 212 (e.g., selection of the carrier frequency, frequency and phase calibration, gain settings, and the like). The antenna controller 216 may control various aspects of the antennas 205 (e.g., beamforming, beam steering, gain settings, frequency tuning, and the like).

The digital subsystem 220 may include a number of digital receiver modules 222, a number of digital transmitter modules 224, a baseband (BB) processor 226, and a control (CTRL) processor 228. Digital subsystem 220 may process communication signals received from RF subsystem 210 and forward the processed communication signals to PSTN interface 230 and/or LAN interface 240, and may process communication signals received from PSTN interface 230 and/or LAN interface 240 and forward the processed communication signals to RF subsystem 210.

Each digital receiver module 222 may correspond to signal processing elements used to manage communications between gateway 200 and UT 400. One of the receive chains of RF transceivers 212 may provide input signals to multiple digital receiver modules 222. A number of digital receiver modules 222 may be used to accommodate all of the satellite beams and possible diversity mode signals being handled at any given time. Although not shown for simplicity, each digital receiver module 222 may include one or more digital data receivers, a searcher receiver, and a diversity combiner and decoder circuit. The searcher receiver may be used to search for appropriate diversity modes of carrier signals, and may be used to search for pilot signals (or other relatively fixed pattern strong signals).

The digital transmitter modules 224 may process signals to be transmitted to UT 400 via satellite 300. Although not shown for simplicity, each digital transmitter module 224 may include a transmit modulator that modulates data for transmission. The transmission power of each transmit modulator may be controlled by a corresponding digital transmit power controller (not shown for simplicity) that may (1) apply a minimum level of power for purposes of interference reduction and resource allocation and (2) apply appropriate levels of power when needed to compensate for attenuation in the transmission path and other path transfer characteristics.

The control processor 228, which is coupled to digital receiver modules 222, digital transmitter modules 224, and baseband processor 226, may provide command and control signals to effect functions such as, but not limited to, signal processing, timing signal generation, power control, handoff control, diversity combining, and system interfacing.

The control processor 228 may also control the generation and power of pilot, synchronization, and paging channel signals and their coupling to the transmit power controller (not shown for simplicity). The pilot channel is a signal that is not modulated by data, and may use a repetitive unchanging pattern or non-varying frame structure type (pattern) or tone type input. For example, the orthogonal function used to form the channel for the pilot signal generally has a constant value, such as all 1's or 0's, or a well-known repetitive pattern, such as a structured pattern of interspersed 1's and 0's.

Baseband processor 226 is well known in the art and is therefore not described in detail herein. For example, the baseband processor 226 may include a variety of known elements such as (but not limited to) coders, data modems, and digital data switching and storage components.

The PSTN interface 230 may provide communication signals to, and receive communication signals from, an external PSTN either directly or through additional infrastructure 106, as illustrated in FIG. 1. The PSTN interface 230 is well known in the art, and therefore is not described in detail herein. For other implementations, the PSTN interface 230 may be omitted, or may be replaced with any other suitable interface that connects gateway 200 to a ground-based network (e.g., the Internet).

The LAN interface 240 may provide communication signals to, and receive communication signals from, an external LAN. For example, LAN interface 240 may be coupled to the internet 108 either directly or through additional infrastructure 106, as illustrated in FIG. 1. The LAN interface 240 is well known in the art, and therefore is not described in detail herein.

The gateway interface 245 may provide communication signals to, and receive communication signals from, one or more other gateways associated with the satellite communication system 100 of FIG. 1 (and/or to/from gateways associated with other satellite communication systems, not shown for simplicity). For some implementations, gateway interface 245 may communicate with other gateways via one or more dedicated communication lines or channels (not shown for simplicity). For other implementations, gateway interface 245 may communicate with other gateways using PSTN 110 and/or other networks such as the Internet 108 (see also FIG. 1). For at least one implementation, gateway interface 245 may communicate with other gateways via infrastructure 106.

Overall gateway control may be provided by gateway controller 250. The gateway controller 250 may plan and control utilization of satellite 300's resources by gateway 200. For example, the gateway controller 250 may analyze trends, generate traffic plans, allocate satellite resources, monitor (or track) satellite positions, estimate delays between the satellite 300 and the SAN 150, and monitor the performance of gateway 200 and/or satellite 300. The gateway controller 250 may also be coupled to a ground-based satellite controller (not shown for simplicity) that maintains and monitors orbits of satellite 300, relays satellite usage information to gateway 200, tracks the positions of satellite 300, and/or adjusts various channel settings of satellite 300.

For the example implementation illustrated in FIG. 2, the gateway controller 250 includes a local time, frequency, and position references 251, which may provide local time and frequency information to the RF subsystem 210, the digital subsystem 220, and/or the interfaces 230, 240, and 245. The time and frequency information may be used to synchronize the various components of gateway 200 with each other and/or with satellite(s) 300. The local time, frequency, and position references 251 may also provide position information (e.g., ephemeris data) of satellite(s) 300 to the various components of gateway 200. Further, although depicted in FIG. 2 as included within gateway controller 250, for other implementations, the local time, frequency, and position references 251 may be a separate subsystem that is coupled to gateway controller 250 (and/or to one or more of digital subsystem 220 and RF subsystem 210).

Although not shown in FIG. 2 for simplicity, the gateway controller 250 may also be coupled to a network control center (NCC) and/or a satellite control center (SCC). For example, the gateway controller 250 may allow the SCC to communicate directly with satellite(s) 300, for example, to retrieve ephemeris data from satellite(s) 300. The gateway controller 250 may also receive processed information (e.g., from the SCC and/or the NCC) that allows gateway controller 250 to properly aim its antennas 205 (e.g., at the appropriate satellite(s) 300), to schedule beam transmissions, to coordinate handovers, and to perform various other well-known functions.

Figure 3:
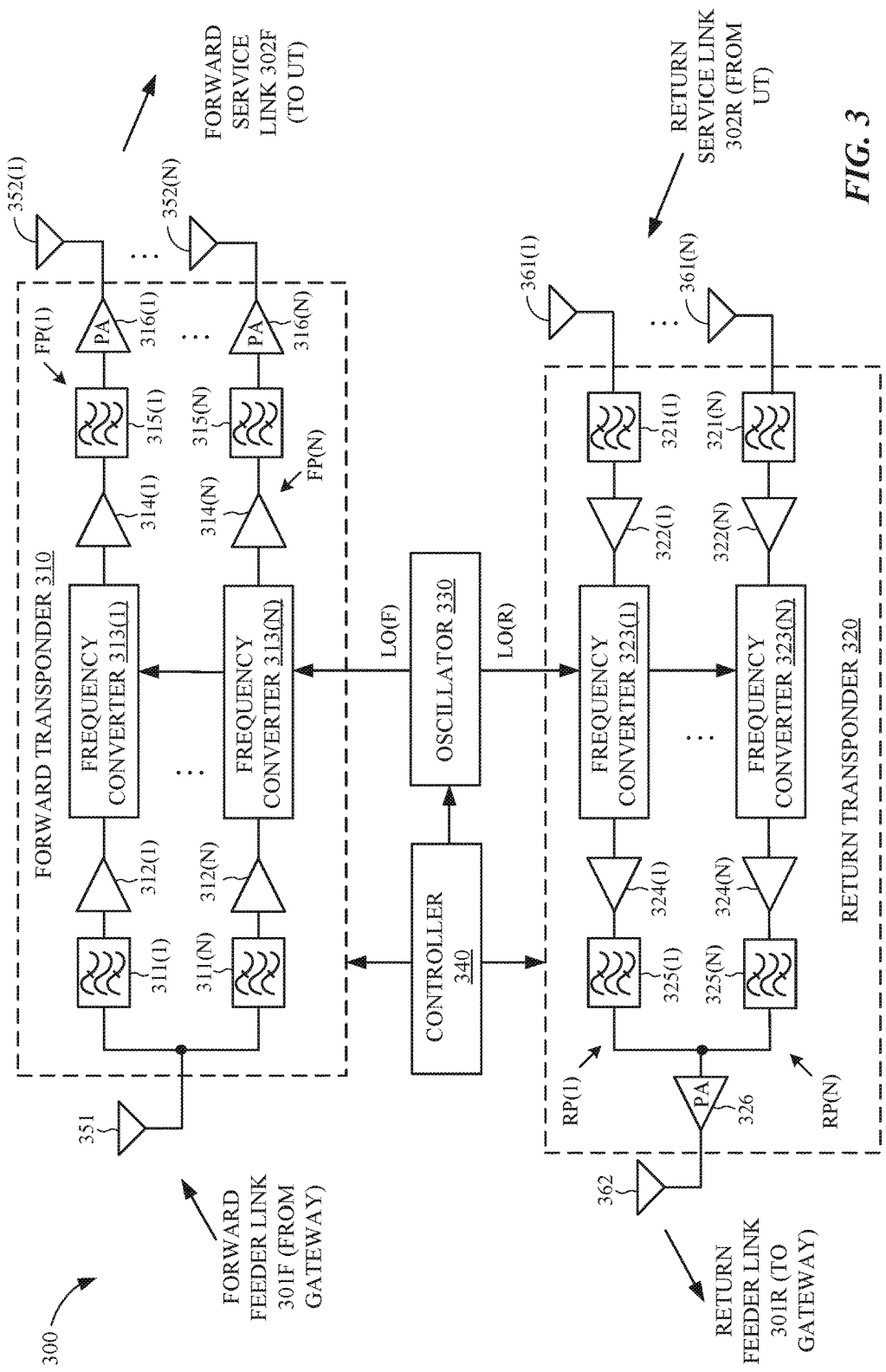
FIG. 3 shows a block diagram of one example of the satellite of FIG. 1.

FIG. 3 is an example block diagram of satellite 300 for illustrative purposes only. It will be appreciated that specific satellite configurations can vary significantly and may or may not include on-board processing. Further, although illustrated as a single satellite, two or more satellites using inter-satellite communication may provide the functional connection between the gateway 200 and UT 400. It will be appreciated that disclosure is not limited to any specific satellite configuration and any satellite or combinations of satellites that can provide the functional connection between the gateway 200 and UT 400 can be considered within the scope of the disclosure. In one example, satellite 300 is shown to include a forward transponder 310, a return transponder 320, an oscillator 330, a controller 340, forward link antennas 351-352, and return link antennas 361-362. The forward transponder 310, which may process communication signals within a corresponding channel or frequency band, may include a respective one of first bandpass filters 311(1)-311(N), a respective one of first LNAs 312(1)-312(N), a respective one of frequency converters 313(1)-313(N), a respective one of second LNAs 314(1)-314(N), and a respective one of second bandpass filters 315(1)-315(N), and a respective one of PAs 316(1)-316(N). Each of the PAs 316(1)-316(N) is coupled to a respective one of antennas 352(1)-352(N), as shown in FIG. 3.

Within each of the respective forward paths FP(1)-FP(N), the first bandpass filter 311 passes signal components having frequencies within the channel or frequency band of the respective forward path FP, and filters signal components having frequencies outside the channel or frequency band of the respective forward path FP. Thus, the pass band of the first bandpass filter 311 corresponds to the width of the channel associated with the respective forward path FP. The first LNA 312 amplifies the received communication signals to a level suitable for processing by the frequency converter 313. The frequency converter 313 converts the frequency of the communication signals in the respective forward path FP (e.g., to a frequency suitable for transmission from satellite 300 to UT 400). The second LNA 314 amplifies the frequency-converted communication signals, and the second bandpass filter 315 filters signal components having frequencies outside of the associated channel width. The PA 316 amplifies the filtered signals to a power level suitable for transmission to UTs 400 via respective antenna 352. The return transponder 320, which includes a number N of return paths RP(1)-RP(N), receives communication signals from UT 400 along return service link 302R via antennas 361(1)-361(N), and transmits communication signals to gateway 200 along return feeder link 301R via one or more antennas 362. Each of the return paths RP(1)-RP(N), which may process communication signals within a corresponding channel or frequency band, may be coupled to a respective one of antennas 361(1)-361(N), and may include a respective one of first bandpass filters 321(1)-321(N), a respective one of first LNAs 322(1)-322(N), a respective one of frequency converters 323(1)-323(N), a respective one of second LNAs 324(1)-324(N), and a respective one of second bandpass filters 325(1)-325(N).

Within each of the respective return paths RP(1)-RP(N), the first bandpass filter 321 passes signal components having frequencies within the channel or frequency band of the respective return path RP, and filters signal components having frequencies outside the channel or frequency band of the respective return path RP. Thus, the pass band of the first bandpass filter 321 may for some implementations correspond to the width of the channel associated with the respective return path RP. The first LNA 322 amplifies all the received communication signals to a level suitable for processing by the frequency converter 323. The frequency converter 323 converts the frequency of the communication signals in the respective return path RP (e.g., to a frequency suitable for transmission from satellite 300 to gateway 200). The second LNA 324 amplifies the frequency-converted communication signals, and the second bandpass filter 325 filters signal components having frequencies outside of the associated channel width. Signals from the return paths RP(1)-RP(N) are combined and provided to the one or more antennas 362 via a PA 326. The PA 326 amplifies the combined signals for transmission to the gateway 200.

Oscillator 330, which may be any suitable circuit or device that generates an oscillating signal, provides a forward local oscillator signal LO(F) to the frequency converters 313(1)-313(N) of forward transponder 310, and provides a return local oscillator signal LO(R) to frequency converters 323(1)-323(N) of return transponder 320. For example, the LO(F) signal may be used by frequency converters 313(1)-313(N) to convert communication signals from a frequency band associated with the transmission of signals from gateway 200 to satellite 300 to a frequency band associated with the transmission of signals from satellite 300 to UT 400. The LO(R) signal may be used by frequency converters 323(1)-323(N) to convert communication signals from a frequency band associated with the transmission of signals from UT 400 to satellite 300 to a frequency band associated with the transmission of signals from satellite 300 to gateway 200.

Controller 340, which is coupled to forward transponder 310, return transponder 320, and oscillator 330, may control various operations of satellite 300 including (but not limited to) channel allocations. In one aspect, the controller 340 may include a memory coupled to a processor (not shown for simplicity). The memory may include a non-transitory computer-readable medium (e.g., one or more nonvolatile memory elements, such as EPROM, EEPROM, Flash memory, a hard drive, etc.) storing instructions that, when executed by the processor, cause the satellite 300 to perform operations including (but not limited to) those described herein with respect to FIGS. 12-15.

Figure 4:
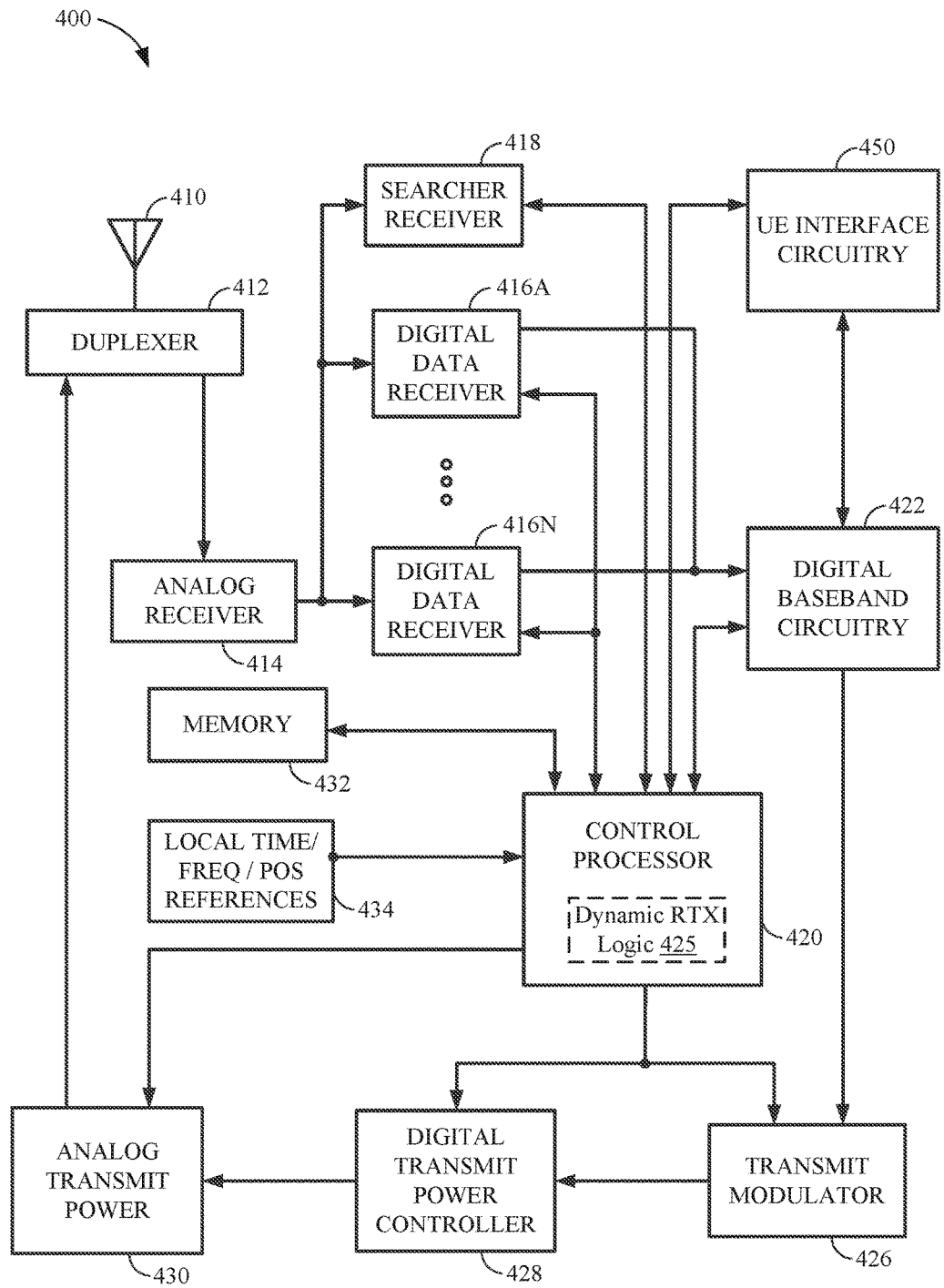
FIG. 4 shows a block diagram of one example of the user terminal (UT) of FIG. 1.

An example of a transceiver for use in the UT 400 or 401 is illustrated in FIG. 4. In FIG. 4, at least one antenna 410 is provided for receiving forward link communication signals (e.g., from satellite 300), which are transferred to an analog receiver 414, where they are down-converted, amplified, and digitized. A duplexer element 412 is often used to allow the same antenna to serve both transmit and receive functions. Alternatively, a UT transceiver may employ separate antennas for operating at different transmit and receive frequencies.

The digital communication signals output by the analog receiver 414 are transferred to at least one digital data receiver 416A and at least one searcher receiver 418. Additional digital data receivers to 416N can be used to obtain desired levels of signal diversity, depending on the acceptable level of transceiver complexity, as would be apparent to one skilled in the relevant art.

At least one user terminal control processor 420 is coupled to digital data receivers 416A-416N and searcher receiver 418. The control processor 420 provides, among other functions, basic signal processing, timing, power and handoff control or coordination, and selection of frequency used for signal carriers. Another basic control function that may be performed by the control processor 420 is the selection or manipulation of functions to be used for processing various signal waveforms. Signal processing by the control processor 420 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources.

The UT 400 may include dynamic RTX logic 425 that may enable the UT 400 to dynamically synchronize retransmission requests, received from a satellite access network (e.g., SAN 150), with RL HARQ processes maintained by the UT 400. More specifically, the dynamic RTX logic 425 may allow the UT 400 to identify previously-transmitted data associated with the retransmission requests based at least in part on timing information received from the SAN, for example, as described in more detail with respect to FIGS. 7-15. In some aspects, the timing information may include a timeline or RTT for timing and/or scheduling the retransmission. In other aspects, the timing information may include a HARQ process identifier for the RL HARQ process associated with the requested data (e.g., to be retransmitted). Thereafter, the UT 400 may retransmit the requested data to the SAN in accordance with a dynamically-configured timeline.

The outputs of digital data receivers 416A-416N are coupled to digital baseband circuitry 422 within the user terminal. The digital baseband circuitry 422 comprises processing and presentation elements used to transfer information to and from UE 500 as shown in FIG. 1, for example. Referring to FIG. 4, if diversity signal processing is employed, the digital baseband circuitry 422 may comprise a diversity combiner and decoder. Some of these elements may also operate under the control of, or in communication with, a control processor 420.

When voice or other data is prepared as an output message or communications signal originating with the user terminal, the digital baseband circuitry 422 is used to receive, store, process, and otherwise prepare the desired data for transmission. The digital baseband circuitry 422 provides this data to a transmit modulator 426 operating under the control of the control processor 420. The output of the transmit modulator 426 is transferred to a power controller 428 which provides output power control to a transmit power amplifier 430 for final transmission of the output signal from the antenna 410 to a satellite (e.g., satellite 300).

In FIG. 4, the UT transceiver also includes a memory 432 associated with the control processor 420. The memory 432 may include instructions for execution by the control processor 420 as well as data for processing by the control processor 420.

In the example illustrated in FIG. 4, the UT 400 also includes an optional local time, frequency and/or position references 434 (e.g., a GPS receiver), which may provide local time, frequency and/or position information to the control processor 420 for various applications, including, for example, time and frequency synchronization for the UT 400.

Digital data receivers 416A-N and searcher receiver 418 are configured with signal correlation elements to demodulate and track specific signals. Searcher receiver 418 is used to search for pilot signals, or other relatively fixed pattern strong signals, while digital data receivers 416A-N are used to demodulate other signals associated with detected pilot signals. However, a digital data receiver 416 can be assigned to track the pilot signal after acquisition to accurately determine the ratio of signal chip energies to signal noise, and to formulate pilot signal strength. Therefore, the outputs of these units can be monitored to determine the energy in, or frequency of, the pilot signal or other signals. These receivers also employ frequency tracking elements that can be monitored to provide current frequency and timing information to control processor 420 for signals being demodulated.

The control processor 420 may use such information to determine to what extent the received signals are offset from the oscillator frequency, when scaled to the same frequency band, as appropriate. This and other information related to frequency errors and frequency shifts can be stored in a storage or memory element 432 as desired.

The control processor 420 may also be coupled to UE interface circuitry 450 to allow communications between UT 400 and one or more UEs. UE interface circuitry 450 may be configured as desired for communication with various UE configurations and accordingly may include various transceivers and related components depending on the various communication technologies employed to communicate with the various UEs supported. For example, UE interface circuitry 450 may include one or more antennas, a wide area network (WAN) transceiver, a wireless local area network (WLAN) transceiver, a Local Area Network (LAN) interface, a Public Switched Telephone Network (PSTN)

interface and/or other known communication technologies configured to communicate with one or more UEs in communication with UT 400.

Figure 5:
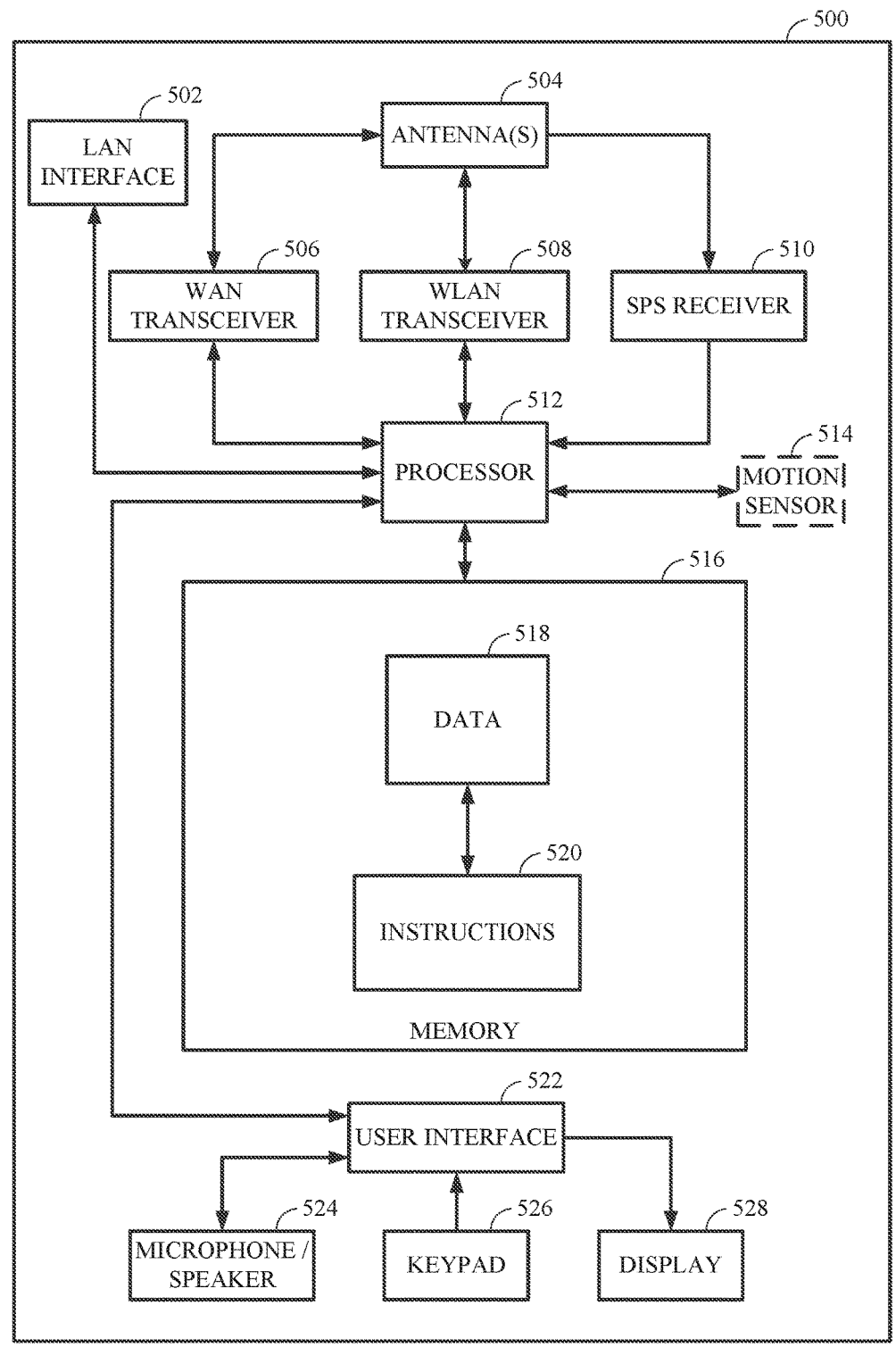
FIG. 5 shows a block diagram of one example of the user equipment (UE) of FIG. 1.

FIG. 5 is a block diagram illustrating an example of UE 500, which also can apply to UE 501 of FIG. 1. The UE 500 as shown in FIG. 5 may be a mobile device, a handheld computer, a tablet, a wearable device, a smart watch, or any type of device capable of interacting with a user, for example. Additionally, the UE may be a network side device (e.g., wireless node, small cell, etc.) that provides connectivity to various ultimate end user devices and/or to various public or private networks. In the example shown in FIG. 5, the UE 500 may comprise a LAN interface 502, one or more antennas 504, a wide area network (WAN) transceiver 506, a wireless local area network (WLAN) transceiver 508, and a satellite positioning system (SPS) receiver 510. The SPS receiver 510 may be compatible with the Global Positioning System (GPS), GLONASS and/or any other global or regional satellite based positioning system. In an alternate aspect, the UE 500 may include a WLAN transceiver 508, such as a Wi-Fi transceiver, with or without the LAN interface 502, WAN transceiver 506, and/or SPS receiver 510, for example. Further, UE 500 may include additional transceivers such as Bluetooth, ZigBee and other known technologies, with or without the LAN interface 502, WAN transceiver 506, WLAN transceiver 508 and/or SPS receiver 510. Accordingly, the elements illustrated for UE 500 are provided merely as an example configuration and are not intended to limit the configuration of UEs in accordance with the various aspects disclosed herein.

In the example shown in FIG. 5, a processor 512 is connected to the LAN interface 502, the WAN transceiver 506, the WLAN transceiver 508 and the SPS receiver 510. Optionally, a motion sensor 514 and other sensors may also be coupled to the processor 512.

A memory 516 is connected to the processor 512. In one aspect, the memory 516 may include data 518 which may be transmitted to and/or received from the UT 400, as shown in FIG. 1. Referring to FIG. 5, the memory 516 may also include stored instructions 520 to be executed by the processor 512 to perform the process steps for communicating with the UT 400, for example. Furthermore, the UE 500 may also include a user interface 522, which may include hardware and software for interfacing inputs or outputs of the processor 512 with the user through light, sound or tactile inputs or outputs, for example. In the example shown in FIG. 5, the UE 500 includes a microphone/speaker 524, a keypad 526, and a display 528 connected to the user interface 522. Alternatively, the user's tactile input or output may be integrated with the display 528 by using a touch-screen display, for example. Once again, the elements illustrated in FIG. 5 are not intended to limit the configuration of the UEs disclosed herein and it will be appreciated that the elements included in the UE 500 will vary based on the end use of the device and the design choices of the system engineers.

Additionally, the UE 500 may be a user device such as a mobile device or external network side device in communication with but separate from the UT 400 as illustrated in FIG. 1, for example. Alternatively, the UE 500 and the UT 400 may be integral parts of a single physical device.

As mentioned above, GSO satellites are deployed in geostationary orbits at approximately 35,000 km above the Earth's surface, and revolve around the Earth in an equatorial orbit at the Earth's own angular velocity. In contrast, NGSO satellites are deployed in non-geostationary orbits and revolve around the Earth above various paths of the Earth's surface at relatively low altitudes (e.g., as compared with GSO satellites).

Figure 6:
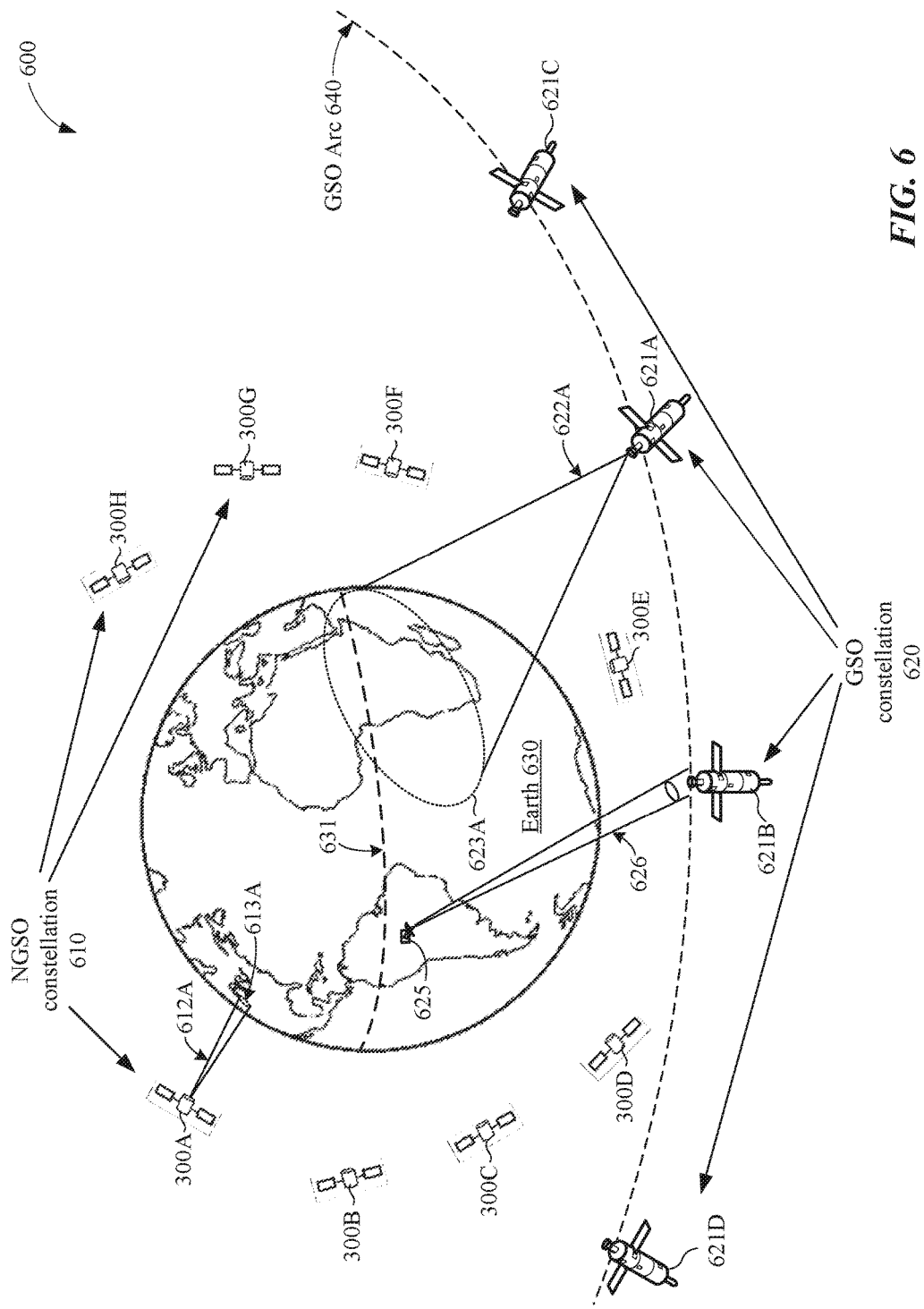
FIG. 6 shows a diagram depicting an NGSO satellite constellation and a GSO satellite constellation orbiting the earth.

For example, FIG. 6 shows a diagram 600 depicting a first constellation 610 of NGSO satellites 300A-300H and a second constellation 620 of GSO satellites 621A-621D in orbit around Earth 630. Although depicted in FIG. 6 as including only eight NGSO satellites 300A-300H, the first constellation 610 may include any suitable number of NGSO satellites, for example, to provide world-wide satellite coverage. For some implementations, the first constellation 610 may include between 600 and 900 NGSO satellites. Similarly, although depicted in FIG. 6 as including only four GSO satellites 621A-621D, the second constellation 620 may include any suitable number of GSO satellites, for example, to provide world-wide satellite coverage. In addition, although not shown in FIG. 6 for simplicity, one or more other constellations of GSO satellites and/or one or more other constellations of NGSO satellites may be in orbit above Earth 630.

The first constellation 610, which may hereinafter be referred to as the NGSO satellite constellation 610, may provide a first satellite service to most, if not all, areas on Earth 630. The second constellation 620, which may hereinafter be referred to as the GSO satellite constellation 620, may provide a second satellite service to large portions of Earth 630. The first satellite service may be different than the second satellite service. For some aspects, the first satellite service provided by the NGSO satellite constellation 610 may correspond to a global broadband Internet service, and the second satellite service provided by the GSO satellite constellation 620 may correspond to a satellite-based broadcast (e.g., television) service. Further, for at least some implementations, each of NGSO satellites 300A-300H may be one example of satellite 300 of FIGS. 1 and 3.

The NGSO satellites 300A-300H may orbit the Earth 630 in any suitable number of non-geosynchronous orbital planes (not shown for simplicity), and each of the orbital planes may include a plurality of NGSO satellites (e.g., such as one or more of the NGSO satellites 300A-300H). The non-geosynchronous orbital planes may include, for example, polar orbital patterns and/or Walker orbital patterns. Thus, to a stationary observer on Earth 630, the NGSO satellites 300A-300H appear to move quickly across the sky in a plurality of different paths across the Earth's surface, with each of the NGSO satellites 300A-300H providing coverage for a corresponding path across the earth's surface.

In contrast, the GSO satellites 621A-621D may be in a geosynchronous orbit around Earth 630 and thus, to a stationary observer on Earth 630, may appear motionless in a fixed position in the sky located above the Earth's equator 631. Each of the GSO satellites 621A-621D maintains a relatively fixed line-of-sight with a corresponding GSO ground station on Earth 630. For example, GSO satellite 621B is depicted in FIG. 6 as maintaining a relatively fixed line-of-sight with a GSO ground station 625. It is noted that for a given point on the surface of Earth 630, there may be an arc of positions in the sky along which the GSO satellites 621A-621D may be located. This arc of GSO satellite positions may be referred to herein as the GSO arc 640. The receiving area for a GSO ground station (e.g., such as GSO ground station 625) may be defined by an antenna pattern of typically fixed orientation and fixed beam width (such as a beam width defined by an ITU specification). For example, the GSO ground station 625 is depicted as transmitting a beam 626 towards GSO satellite 621B.

In some aspects, each of the NGSO satellites 300A-300H may include a number of directional antennas to provide high-speed forward links (e.g., downlinks) with user terminals such as UT 400 of FIG. 1 and/or with gateways such as gateway 200 of FIG. 1. A high-gain directional antenna achieves higher data rates and is less susceptible to interference than an omni-directional antenna by focusing radiation into a relatively narrow beam width (as compared to the relatively wide beam width associated with an omni-directional antenna). For example, as depicted in FIG. 6, the coverage area 613A provided by a beam 612A transmitted from NGSO satellite 300A is relatively small compared to the coverage area 623A provided by a beam 622A transmitted from GSO satellite 621A.

Because the NGSO satellites 300A-300H revolve around the earth 630 relatively quickly (e.g., approximately every 90 minutes for low-earth-orbit (LEO) satellites), their positions change quickly relative to a fixed location on earth 630. To provide coverage over a wide area of the earth's surface (e.g., to provide Internet services across the United States), each of the NGSO satellites 300A-300H may provide coverage for a corresponding path across the earth's surface. For example, the NGSO satellites 300A-300H may each transmit any number of beams, and one or more of the beams may be directed towards overlapping regions on the earth's surface. As used herein, the footprint of a satellite is the surface area (on Earth) within which all UTs can communicate with the satellite (above a minimum elevation angle). The area covered by a beam transmitted (e.g., from a corresponding antenna) of the satellite is referred to herein as the beam coverage area. Thus, the footprint of a satellite may be defined by a number of beam coverage areas provided by a number of beams transmitted from the satellite.

Figure 7:
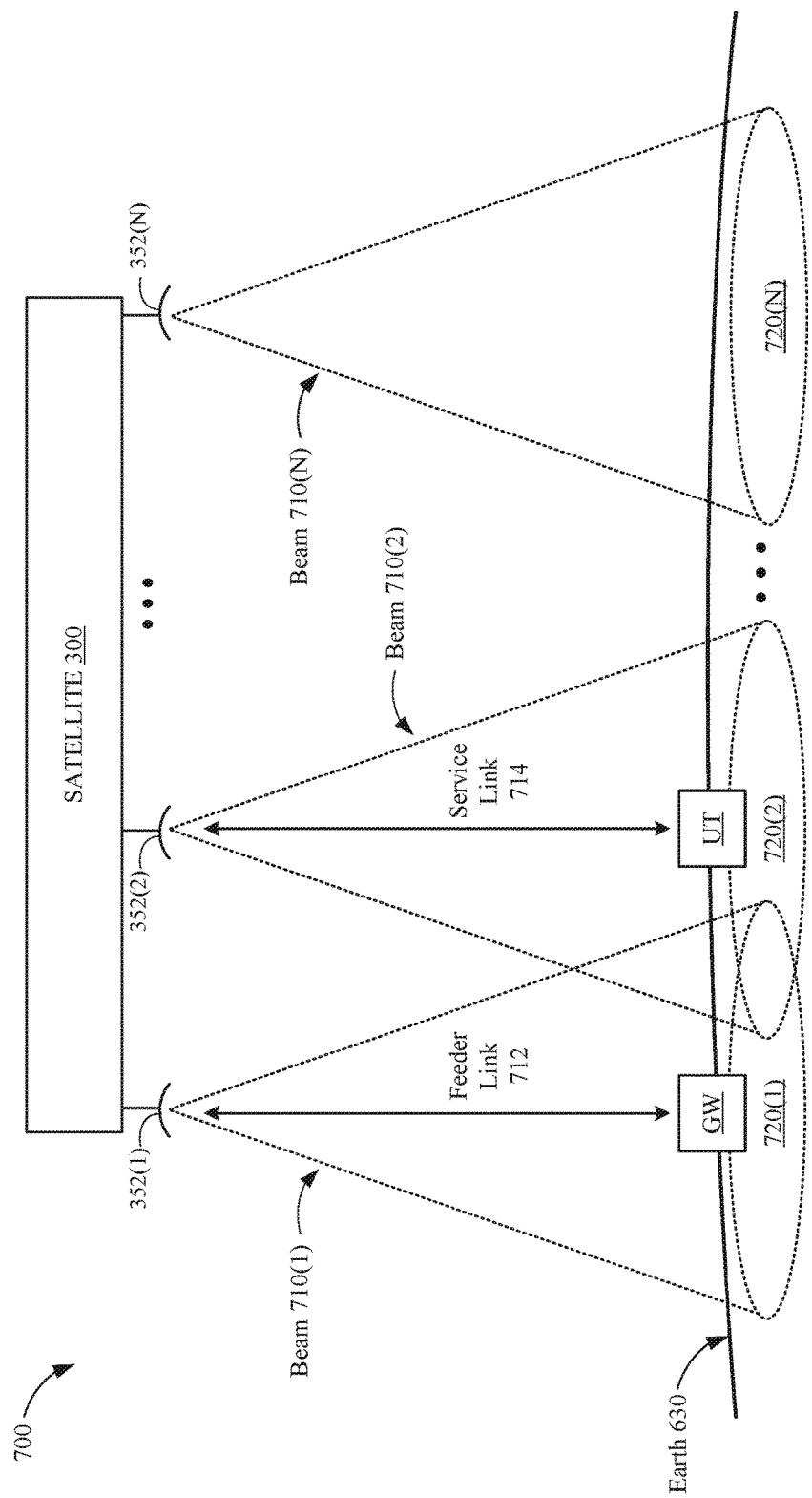
FIG. 7 depicts an NGSO satellite transmitting a number of beams onto the surface of the Earth.

FIG. 7 shows a diagram 700 depicting satellite 300 transmitting a number (N) of beams 710(1)-710(N) from a respective number (N) of antennas 352(1)-352(N). Referring also to FIG. 3, each of the antennas 352(1)-352(N) may be coupled to a corresponding return path (RP) in the return transponder 320 of satellite 300. Each of the beams 710(1)-710(N) may be used to transmit data between a gateway GW and a user terminal UT that are located within the beam's coverage area on Earth 630. For example, the gateway GW and user terminal UT may be respective embodiments of gateway 200 of FIG. 2 and UT 400 of FIG. 4. More specifically, the gateway GW may be included in, or form at least part of, a satellite access network (e.g., SAN 150 of FIG. 1). Thus, the GW may communicate with the satellite 300 via a feeder link 712, and the UT may communicate with the satellite 300 via a service link 714.

For the example diagram 700 of FIG. 7, the beams 710(1)-710(N) are depicted as providing coverage areas 720(1)-720(N), respectively, on Earth 630. Together, the coverage areas 720(1)-720(N) provided by respective beams 710(1)-710(N) may define the footprint of satellite 300. Each of the coverage areas 720(1)-720(N) may extend across an entire width of the satellite's footprint. In some implementations, the coverage areas 720(1)-720(N) may be of other suitable shapes, sizes, and/or orientations. Further, for at least some implementations, all satellites 300 in the NGSO satellite constellation 610 may have substantially similar footprints. Each of the beams 710(1)-710(N) operates as a respective communications channel of the satellite 300. Adjacent pairs of the coverage areas 720(1)-720(N) may touch and/or overlap each other, for example, so that the footprint provided by the beams 710(1)-710(N) may have minimal coverage gaps. Although the GW is depicted as residing within the footprint 720(1) of beam 710(1) (for simplicity), the GW may communicate (e.g., via any of the beams 710(1)-710(N) of the satellite 300) with user terminals in any of the beam coverage areas 720(1)-720(N).

As the satellite 300 passes over the gateway GW and user terminal UT, the channel quality of a given beam may deteriorate, whereas the channel quality of a different beam may improve. Thus, each of the gateway GW and/or user terminal UT may periodically switch communication channels from one beam to another. This process may be referred to herein as "inter-beam handover." The movement of the satellite 300 may also cause changes in signal propagation times with the gateway GW (e.g., along the feeder link 712) and/or the user terminal UT (e.g., along the service link 714). In particular, changes in feeder-link delay may affect the timing of communications with all user terminals serviced by a particular gateway. For example, an increase in signal propagation delay along the feeder link 712 may cause an increase in the latency of communications between the gateway GW and user terminal UT as well as any additional user terminals (not shown for simplicity) serviced by the gateway GW.

Communications between the SAN and the user terminal UT may be half-duplex. To support half-duplex communication, transmissions on the forward link (e.g., from GW to UT) may be coordinated with transmissions on the reverse link (e.g., from UT to GW). Thus, a given communications cycle may be subdivided into a number of forward-link (FL) transmissions and a number of reverse-link (RL) transmissions. For example, each FL transmission may correspond with an individual subframe (e.g., FL subframe) of data and/or control information sent from the SAN to the user terminal UT. Similarly, each RL transmission may correspond with an individual subframe (e.g., RL subframe) of data and/or control information sent from the user terminal UT to the SAN. The FL subframes and RL subframes of a given communication cycle may collectively form a communication (or "radio") frame. Thus, a typical communication frame may have an overall duration of a single communication cycle.

HARQ is a process by which a receiving device may request retransmission of data that was received in error. Unlike standard automatic repeat request (ARQ) processes, which are carried out by the radio link control (RLC) layer, HARQ processes are performed at the physical (PHY) layer (e.g., and managed by the media access control (MAC) layer). More specifically, HARQ allows for buffering and combining of incorrectly received data (e.g., packets, frames, PDUs, MPDUs, etc.) to potentially reduce the number of retransmissions needed to properly reconstruct a particular unit of data. For example, if the SAN receives an incorrect unit of data (e.g., corresponding to an RL subframe) from the user terminal UT, the SAN may request retransmission of that particular unit of data from the user terminal UT. Rather than discard the incorrect unit of data, the SAN may store the incorrect data (e.g., in a HARQ buffer) to be combined with the retransmitted data, for example, to more quickly recover the correct unit of data. For example, if both the original unit of data and the retransmitted data have errors, the SAN may combine the error-free portions to reconstruct the correct unit of data. This process may be repeated, as necessary, for any number of retransmissions (e.g., until the correct unit of data is recovered). The SAN may use the FL subframes (e.g., of a given communication frame) to send HARQ feedback information to the user terminal UT. The HARQ feedback information may include an acknowledgement (ACK) or negative acknowledgement (NACK) of respective RL data (e.g., that was received correctly or incorrectly). The HARQ feedback information may also include additional information, for example, indicating what portion of the RL data is to be retransmitted (e.g., RV index).

Each HARQ process is associated with a corresponding HARQ process identifier (ID). For example, the HARQ process ID may be used by the SAN and/or user terminal to keep track of any data that was received correctly and/or incorrectly for a corresponding HARQ process. Typically, FL HARQ processes (e.g., associated with FL data sent by a SAN to a user terminal) are asynchronous. Thus, when a particular user terminal requests retransmission of a FL subframe, the retransmission request sent by the user terminal to the SAN may include the HARQ process ID associated with the FL subframe. This allows the SAN to quickly determine the exact subframe of data to be retransmitted to the user terminal. On the other hand, conventional RL HARQ processes (e.g., associated with RL data sent by a user terminal to a SAN) are synchronous. Thus, when a SAN requests retransmission of an RL subframe, the retransmission request sent by the SAN to the user terminal may not include the HARQ process ID associated with the RL subframe. Instead, the user terminal identifies the subframe of data to be retransmitted to the SAN based on the timing of the retransmission request.

For example, the user terminal UT may implement a HARQ round-trip time (RTT) when processing retransmission requests received from the SAN. The HARQ RTT may correspond to a delay between the initial transmission of an RL subframe and a subsequent retransmission of that subframe (e.g., in response to a retransmission request from the SAN). Based on the HARQ RTT, a processing time of the user terminal UT (e.g., time needed to process a received retransmission request), and the time at which the retransmission request was received, the user terminal UT may determine the precise time at which the requested RL subframe was originally transmitted to the SAN. For example, upon receiving a retransmission request at a given instance in time (T), the user terminal may determine the time at which the requested RL data was originally transmitted (To) by adding the processing time (PT) and subtracting the HARQ RTT (e.g., $T_0=T+PT-RTT$). Thus, assuming a HARQ RTT of 40 ms and a processing time of 6 ms, the user terminal UT may determine that a retransmission request received at time T is for an RL subframe that was transmitted 34 ms earlier (e.g., $T_0=T-34$). In this manner, the user terminal UT may synchronize received retransmission requests with respective HARQ processes without knowledge of their associated HARQ process IDs.

As described above, movement of the satellite 300 may cause changes in feeder-link delay between the gateway GW and the satellite 300. Thus, the actual delay in communications between the SAN and the user terminal UT may vary over time. For example, an RL transmission initiated by the user terminal UT at a particular instance in time may take a longer (or shorter) time to reach the SAN than another RL transmission initiated at a different instance in time. Similarly, an FL transmission (e.g., a retransmission request) initiated by the SAN at a particular instance in time may take a longer (or shorter) time to reach the user terminal UT than another FL transmission initiated by the SAN at a different instance in time. To ensure proper synchronization between retransmission requests and associated RL data, conventional RL HARQ processes adhere to a fixed schedule or timeline for processing retransmission requests. For example, the user terminal UT may implement a preconfigured delay (e.g., HARQ RTT) between the timing of an RL data transmission and a subsequent retransmission of the RL data.

The example implementations recognize that, by adhering to a fixed HARQ timeline, some user terminals (e.g., that experience less than a threshold amount of feeder-link delay) may suffer a significant latency penalty in their respective communications with the SAN. Thus, for at least some implementations, the SAN and/or user terminals may dynamically adjust a HARQ timeline for processing retransmission requests associated with RL HARQ processes.

Figure 8:
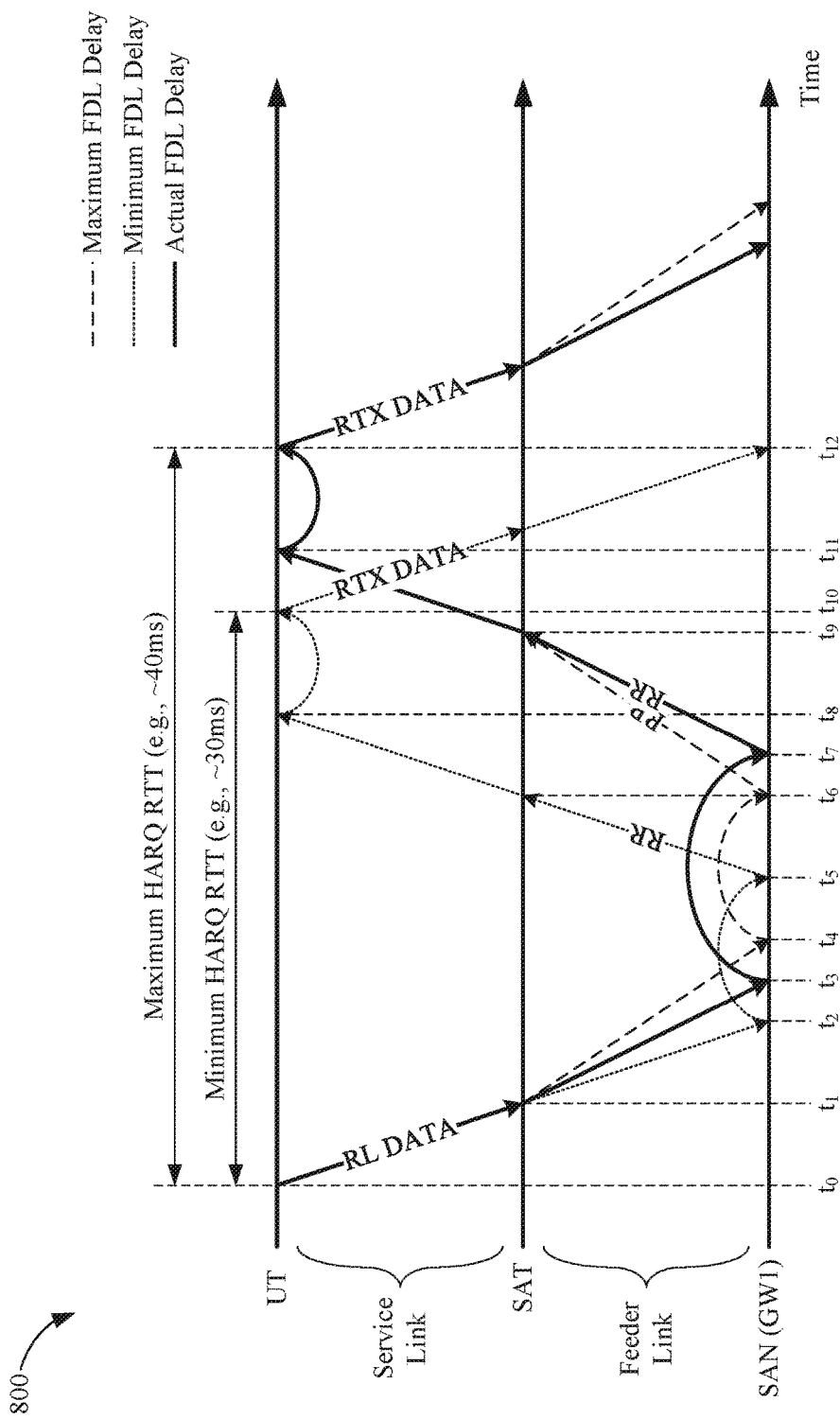
FIG. 8 shows an example timing diagram depicting a reverse-link (RL) hybrid automatic repeat request (HARQ) process with varying amounts of feeder-link delay.

FIG. 8 shows an example timing diagram 800 depicting a reverse-link (RL) hybrid automatic repeat request (HARQ) process with varying amounts of feeder-link delay. For purposes of discussion herein, the user terminal (UT) may correspond to UT 400 of FIG. 4, the satellite access network (SAN) may correspond to SAN 150 of FIG. 1, and the satellite (SAT) may correspond to satellite 300 of FIG. 3. Furthermore, the SAN may communicate with the UT (and SAT) via an associated gateway GW, which may correspond to gateway 200 of FIG. 2. As described above, the SAN may forward or relay communications between the UT and the SAN (e.g., via the GW). More specifically, the UT may communicate with the SAT via a service link (e.g., service link 714 of FIG. 7) and the SAN (or GW) may communicate with the SAT via a feeder link (e.g., feeder link 712 of FIG. 7).

At time $t_0$, the UT initiates a reverse-link (RL) data transmission to the SAN via the service link. Due to propagation delays in the service link, the SAT receives the RL data some time later (e.g., at time $t_1$). Then, at time $t_1$, the SAT relays the RL data to the SAN. The SAN may subsequently receive the RL data from the SAT some time later, depending on an amount of delay in the feeder link at that time. For purposes of discussion, it may be assumed that the propagation delay in the SAT (e.g., which is relatively insignificant) is included as part of the feeder link delay. In the example of FIG. 8, a dashed line traces the potential signal path of the RL data given a maximum amount of feeder-link delay, whereas a dotted line traces the potential signal path of the RL data given a minimum amount of feeder-link delay. The actual signal path of the RL data is shown as a solid line. As shown in the example of FIG. 8, the actual amount of feeder-link delay experienced by the UT is between the maximum and minimum feeder-link delays.

Given a maximum amount of feeder-link delay, the SAN would receive the RL data from the SAT at time $t_4$. The SAN would then check the received RL data (e.g., based on cyclic redundancy check (CRC) and/or forward error correction (FEC) information), from times $t_4$ to $t_6$, to determine whether the RL data is received correctly (e.g., and to fix any correctable errors in the received RL data). Then, at time $t_6$, the SAN would return a HARQ feedback message to the UT, via the feeder link, based on a result of the determination. In the example of FIG. 8, at least some of the received RL data is incorrect and/or cannot be corrected through FEC. Thus, the SAN would send a negative acknowledgement (NACK) and/or retransmission request (RR) to the UT, at time $t_6$, to request retransmission of the RL data (e.g., or one or more portions thereof). The SAT would receive the retransmission request via the feeder link and relay the message to the UT via the service link. Due to delays in the feeder link and service link, the UT would receive the retransmission request some time later (e.g., at time $t_{11}$). The UT would then process the retransmission request, from times $t_{11}$ to $t_{12}$, and retransmit the RL data (e.g., as retransmitted (RTX) data) to the SAN at time $t_{12}$.

The amount of feeder link delay may vary between the maximum amount (e.g., as described above) and a minimum amount. Given a minimum amount of feeder-link delay, the SAN could receive the RL data from the SAT at time $t_2$. The SAN could then potentially check the received RL data (e.g., based on CRC and/or FEC information), from times $t_2$ to $t_5$, to determine whether the RL data is received correctly (e.g., and to fix any correctable errors in the received RL data). Then, at time $t_5$, the SAN could return a HARQ feedback message to the UT, via the feeder link, based on a result of the determination. More specifically, in the example of FIG. 8, the SAN could send a NACK and/or retransmission request to the UT, at time $t_5$, to request retransmission of any portion of the RL data that was not received correctly. The SAT would receive the retransmission request via the feeder link, at time $t_6$, and relay the message to the UT via the service link. Due to the shorter feeder-link delay, the UT could potentially receive the retransmission request much sooner (e.g., at time $t_8$). The UT could then process the retransmission request sooner (e.g., from times $t_8$ to $t_{10}$), and retransmit the RL data to the SAN at time $t_{10}$.

As described above, with respect to FIG. 7, RL HARQ processes are typically synchronous. Thus, in order to match a received retransmission request with the appropriate RL data (e.g., to be retransmitted), the timing of the retransmission request must be aligned or synchronized with a HARQ timeline maintained by the UT. If a retransmission request is received too early (or too late) relative to the HARQ timeline, the UT may be unable to fulfill the retransmission request or may retransmit the wrong RL data to the SAN. To compensate for the varying amounts of feeder-link delay, conventional RL HARQ processes assume a "worst-case" scenario (e.g., maximum feeder-link delay) to ensure that the SAN has sufficient time to receive the RL data via the feeder link and to transmit a feedback message back over the feeder link. In other words, the UT would expect a retransmission request to arrive at time $t_{11}$ (e.g., for RL data originally transmitted at time $t_0$), regardless of the actual feeder-link delay between the SAT and the SAN (or GW).

The actual feeder-link delay may be between the maximum and the minimum feeder-link delays (inclusive). Thus, in the example of FIG. 8, the SAN may actually receive the RL data from the SAT at time $t_3$ (e.g., which is sooner than the SAN would have received the RL data under maximum feeder-link delay, but later than the SAN would have received the RL data under minimum feeder-link delay). However, to ensure proper synchronization with a conventional (e.g., fixed or static) HARQ timeline maintained by the UT, the SAN would have to wait until time $t_7$ to send the retransmission request to the UT. This would ensure that the SAT receives the retransmission request at the same time at which it would receive the retransmission request under maximum feeder-link delay (e.g., at time $t_9$). The UT would then receive the retransmission request from the SAT at the expected time (e.g., at time $t_{11}$).

As shown in FIG. 8, the maximum feeder-link delay results in a HARQ RTT of ~40 ms, whereas the minimum feeder-link delay could potentially result in a HARQ RTT of ~30 ms. However, by assuming a worst-case scenario, conventional RL HARQ processes may impose latency penalties on user terminals that do not experience the maximum amount of feeder-link delay. For example, even though the SAN actually receives the RL data at time $t_3$ (e.g., earlier than it would have under maximum feeder-link delay), the SAN is required to wait until time $t_7$ (e.g., later than it would have under maximum feeder-link delay) before it can transmit a retransmission request associated with the received RL data. Thus, it would be desirable to allow the SAN to generate retransmission requests, and to enable the UT to process such retransmission requests, as quickly as possible (e.g., based on the actual feeder-link delay).

In example implementations, the SAN may dynamically alter or configure the HARQ timeline (e.g., for RL HARQ processes) based on the actual feeder-link delay between the SAN and the SAT. In some aspects, the SAN may generate retransmission requests immediately after receiving the associated RL data (e.g., and determining that the RL data is received with errors). This may reduce the latency of retransmission requests whenever the actual feeder-link delay is less than the maximum amount (e.g., since the SAN does not have to delay the retransmission request to coincide with the maximum feeder-link delay). To account for variations in the timing of retransmission requests, the UT may implement a dynamic HARQ RTT for processing the retransmission requests received from the SAN. More specifically, the dynamic HARQ RTT may be any length of time between the maximum HARQ RTT and minimum HARQ RTT (inclusive), depending on the actual feeder-link delay observed by the SAN (and/or gateway GW). This may allow the UT to dynamically adjust (e.g., reduce) the latency of retransmissions on the reverse link while maintaining synchronization between received retransmission requests and their associated HARQ processes (e.g., corresponding to the originally-transmitted RL data).

In example implementations, the dynamic HARQ RTT may be adjusted based at least in part on changes in feeder-link delay. However, in other implementations, the dynamic HARQ RTT may be adjusted based on other factors in addition to (or in lieu of) feeder-link delay. For example, in some aspects, the dynamic HARQ RTT may be adjusted based on changes in service-link delay (e.g., between the SAT and the UT). In yet another aspect, the dynamic HARQ RTT may be adjusted based on changes in both feeder-link delay and service-link delay.

Figure 9:
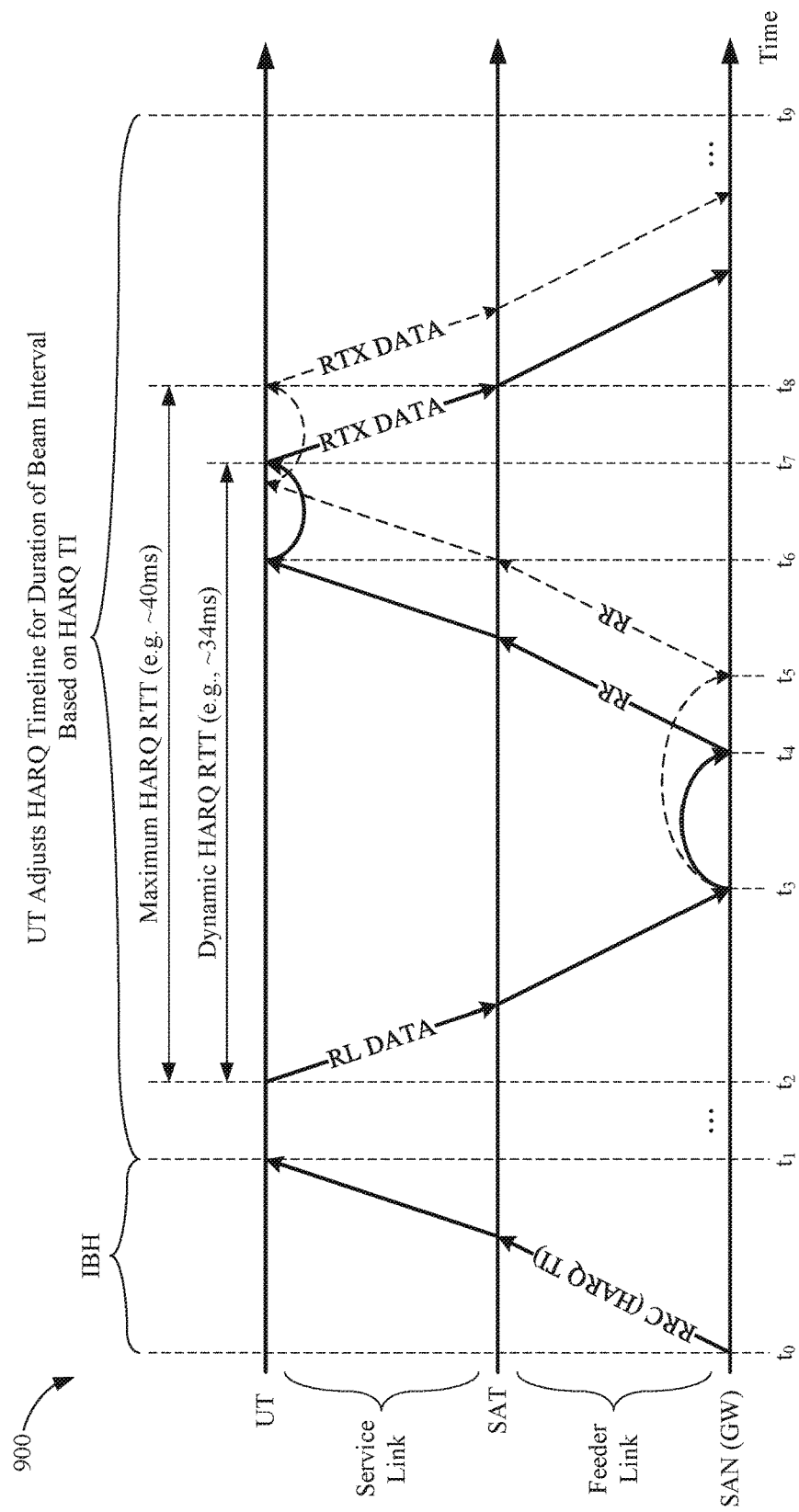
FIG. 9 shows an example timing diagram depicting an RL HARQ process with a configurable timeline that may be dynamically adjusted per beam interval.

FIG. 9 shows an example timing diagram 900 depicting an RL HARQ process with a configurable timeline that may be dynamically adjusted per beam interval. For purposes of discussion herein, the user terminal (UT) may correspond to UT 400 of FIG. 4, the satellite access network (SAN) may correspond to SAN 150 of FIG. 1, and the satellite (SAT) may correspond to satellite 300 of FIG. 3. Furthermore, the SAN may communicate with the UT (and SAT) via an associated gateway GW, which may correspond to gateway 200 of FIG. 2. As described above, the SAT may forward or relay communications between the UT and the SAN (e.g., via the GW). More specifically, the UT may communicate with the SAT via a service link (e.g., service link 714 of FIG. 7) and the SAN (or GW) may communicate with the SAT via a feeder link (e.g., feeder link 712 of FIG. 7).

At time $t_0$, the SAN transmits a radio resource control (RRC) configuration message to the UT via the feeder link. For example, the transmission of the RRC configuration message may coincide with an inter-beam handover (IBH), from times $t_0$ to $t_1$, to hand off communications with the UT from a first beam to a second beam of the SAT. More specifically, the RRC configuration message may be used to reconfigure and/or reestablish communications between the SAN and the UT as a result of the inter-beam handover. In example implementations, the RRC configuration message may include HARQ timing information (TI) that may be used to dynamically configure or adjust a HARQ timeline implemented by the UT (e.g., for processing retransmission requests from the SAN).

The HARQ timing information may include a dynamic HARQ RTT to be implemented by the UT for the given beam interval (e.g., from times $t_1$ to $t_9$). In the example of FIG. 9, the dynamic HARQ RTT may correspond to an interval of ~34 ms. In some aspects, the SAN may determine the dynamic HARQ RTT based at least in part on an amount of feeder-link delay observed by the GW at the time the inter-beam handover is initiated (e.g., at time to). For example, each gateway of a SAN may be configured to continuously monitor its respective feeder-link delay. Thus, the SAN may periodically update the dynamic HARQ RTT (e.g., for each beam interval) based on changes in the amount of feeder-link delay observed by the GW. Although only one user terminal is shown in FIG. 9, for simplicity, the HARQ timing information may be broadcast to all user terminals served by the particular gateway GW (e.g., and thus experience the same feeder-link delay).

The UT receives the RRC configuration message, at time $t_1$, via the service link of the SAT. The UT may then apply the HARQ timing information, included with the RRC configuration message, to RL HARQ processes associated with the gateway GW. As described above, the UT may configure or adjust its timeline for retransmitting data (e.g., requested by the SAN) based on the HARQ timing information. For example, rather than adhere to a fixed (e.g., maximum) HARQ RTT, the UT may implement a dynamic HARQ RTT that may be less than the maximum HARQ RTT. In the example of FIG. 9, the dynamic HARQ RTT may be ~34 ms (e.g., 6 ms shorter than the maximum HARQ RTT). In some aspects, the UT may use the dynamic HARQ RTT when processing any retransmission requests received from the SAN over the duration of the beam interval (e.g., from times $t_1$ to $t_9$).

For example, at time $t_2$, the UT may initiate an RL data transmission to the SAN via the service link. The SAT receives the RL data via the service link and relays the communication to the SAN via the feeder link. Due to propagation delays in the service link and feeder link, the SAN receives the RL data some time later (e.g., at time $t_3$). In the example of FIG. 9, the actual feeder-link delay between the SAN and the SAT is less than a maximum feeder-link delay. Thus, the SAN may receive the RL data from the SAT earlier than it otherwise would under the worst-case scenario (e.g., assuming the maximum feeder-link delay). The SAN then checks the received RL data (e.g., based on CRC and/or FEC information), from times $t_3$ to $t_4$, to determine whether the RL data is received correctly (e.g., and to fix any correctable errors in the received RL data). Then, at time $t_4$, the SAN may send a retransmission request (RR) to the UT to request retransmission of at least a portion of the RL data. More specifically, rather than wait an extended period of time (e.g., until time $t_5$) to align the retransmission request with the maximum HARQ RTT, the SAN may initiate the retransmission request (e.g., at time $t_4$) immediately after receiving the RL data and determining that the RL data contains errors.

The SAT receives the retransmission request via the feeder link and relays the message to the UT via the service link. Due to delays in the feeder link and service link, the UT receives the retransmission request some time later (e.g., at time $t_6$). Given the reduced latency in generating retransmission requests at the SAN, the UT may receive the retransmission request sooner than it otherwise would have according to a conventional HARQ timeline (e.g., where maximum feeder-link delay is assumed). Thus, in example implementations, the UT may use the HARQ timing information received from the SAN to synchronize the retransmission request with a corresponding RL HARQ process. For example, the UT may use the dynamic HARQ RTT (e.g., after factoring in its own processing time) to determine that the retransmission request received at time $t_6$ is for RL data previously transmitted at time $t_2$. The UT may then process the retransmission request, from times $t_6$ to $t_7$, and retransmit the RL data (e.g., as RTX data) to the SAN at time $t_7$.

By comparison, according to a conventional (e.g., fixed or static) HARQ timeline, the SAN would delay sending the retransmission request until time $t_5$ (e.g., even though the SAN may be capable of sending the retransmission request sooner, at time $t_4$). As a result, the UT would not transmit the RTX data until much later, at time $t_8$ (e.g., corresponding to the maximum HARQ RTT). By implementing a dynamic HARQ RTT in the manner described with respect to FIG. 9, the SAN (e.g., and UT) may significantly reduce the latency of retransmissions on the reverse link of the satellite communication system. More specifically, by including the HARQ timing information in RRC configuration messages, the SAN may dynamically adjust the HARQ timeline for RL HARQ processes with minimal additional overhead (e.g., since the RRC configuration messages are exchanged periodically, during inter-beam handovers).

The SAN may communicate HARQ timing information to the UT in a number of ways. As described above, with reference to FIG. 9, the HARQ timing information may be provided in RRC configuration messages. However, in other implementations, the SAN may communicate the HARQ timing information to the UT using RL grant messages. Each RL grant message may allocate resources on the reverse link (e.g., an RL subframe) that may be used by the UT to transmit RL data to the SAN. In some aspects, the HARQ timing information may be provided in an RL grant message allocating an initial transmission of RL data from the UT to the SAN. In such implementations, the UT may utilize the HARQ timing information for any subsequent retransmissions of the RL data associated with the RL grant. In other aspects, the HARQ timing information may be provided in RL grant messages associated with retransmission requests. In such implementations, the UT may utilize new HARQ timing information for each individual retransmission.

Figure 10A:
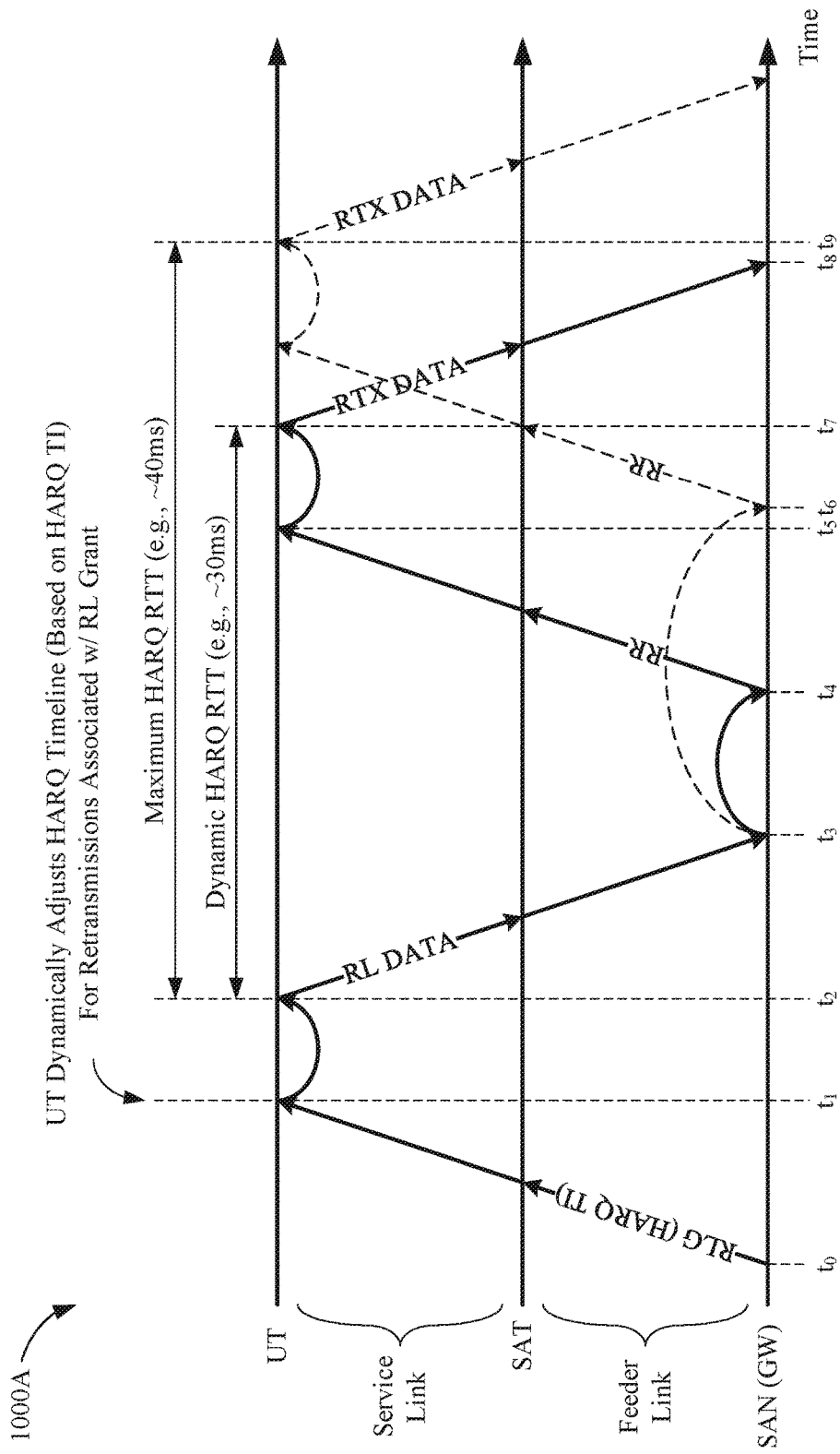
FIG. 10A shows an example timing diagram depicting an RL HARQ process with a configurable timeline that may be dynamically adjusted per HARQ process.

FIG. 10A shows an example timing diagram 1000A depicting an RL HARQ process with a configurable timeline that may be dynamically adjusted per HARQ process. For purposes of discussion herein, the user terminal (UT) may correspond to UT 400 of FIG. 4, the satellite access network (SAN) may correspond to SAN 150 of FIG. 1, and the satellite (SAT) may correspond to satellite 300 of FIG. 3. Furthermore, the SAN may communicate with the UT (and SAT) via an associated gateway GW, which may correspond to gateway 200 of FIG. 2. As described above, the SAN may forward or relay communications between the UT and the SAN (e.g., via the GW). More specifically, the UT may communicate with the SAT via a service link (e.g., service link 714 of FIG. 7) and the SAN (or GW) may communicate with the SAT via a feeder link (e.g., feeder link 712 of FIG. 7).

At time to, the SAN transmits an RL grant message (RLG) to the UT via the feeder link. The RL grant message may allocate resources on the reverse link that may be used by the UT to transmit RL data to the SAN. The SAT receives the RL grant message via the feeder link and relays the message to the UT via the service link. Due to propagation delays in the service link and feeder link, the UT receives the RL grant message some time later (e.g., at time $t_1$). In example implementations, the RL grant message may include HARQ timing information (TI) that may be used to dynamically configure or adjust a HARQ timeline implemented by the UT (e.g., for processing retransmission requests from the SAN). For example, the HARQ timing information may include a dynamic HARQ RTT to be implemented by the UT for subsequent retransmissions of the RL data associated with the RL grant message.

In the example of FIG. 10A, the dynamic HARQ RTT may correspond to an interval of ~30 ms. In some aspects, the SAN may determine the dynamic HARQ RTT based at least in part on an amount of feeder-link delay observed by the GW at the time the RL grant message is sent (e.g., at time $t_0$). In this manner, the SAN may update the dynamic HARQ RTT (e.g., based on the current feeder-link delay) each time a new RL grant message is communicated to the UT. In other implementations, the HARQ timing information may include a HARQ process identifier (ID) for the RL HARQ process associated with the requested data. As described above, the HARQ process ID may be used by the SAN and/or user terminal to keep track of any data that was received correctly and/or incorrectly for a given HARQ process.

At time $t_2$, the UT initiates an RL data transmission to the SAN via the service link. The SAT receives the RL data via the service link and relays the communication to the SAN via the feeder link. Due to propagation delays in the service link and feeder link, the SAN receives the RL data some time later (e.g., at time $t_3$). In the example of FIG. 10A, the actual feeder-link delay between the SAN and the SAT may be equal to the minimum feeder-link delay. Thus, the SAN receives the RL data from the SAT much earlier than it otherwise would under the worst-case scenario. The SAN then checks the received RL data (e.g., based on CRC and/or FEC information), from times $t_3$ to $t_4$, to determine whether the RL data is received correctly (e.g., and to fix any correctable errors in the received RL data). Then, at time $t_4$, the SAN may send a retransmission request (RR) to the UT to request retransmission of at least a portion of the RL data. More specifically, rather than wait an extended period of time (e.g., until time $t_6$) to align the retransmission request with the maximum HARQ RTT, the SAN may initiate the retransmission request (e.g., at time $t_4$) immediately after receiving the RL data and determining that the RL data contains errors.

The SAT receives the retransmission request via the feeder link and relays the message to the UT via the service link. Due to delays in the feeder link and service link, the UT receives the transmission request some time later (e.g., at time $t_5$). Given the reduced latency in generating retransmission requests at the SAN, the UT may receive the retransmission request sooner than it otherwise would have according to a conventional HARQ timeline (e.g., where maximum feeder-link delay is assumed). Thus, in example implementations, the UT may use the HARQ timing information received from the SAN to synchronize the retransmission request with a corresponding RL HARQ process. In some aspects, the UT may use a dynamic HARQ RTT (e.g., after factoring in its own processing time) to determine that the retransmission request received at time $t_5$ is for RL data previously transmitted at time $t_2$. In other aspects, the UT may use a HARQ process ID to identify the RL HARQ process (e.g., and corresponding RL data) associated with the retransmission request. The UT may then process the retransmission request, from times $t_5$ to $t_7$, and retransmit the RL data (e.g., as RTX data) to the SAN at time $t_7$.

By comparison, according to a conventional (e.g., fixed or static) HARQ timeline, the SAN would delay sending the retransmission request until time $t_6$ (e.g., even though the SAN may be capable of sending the retransmission request sooner, at time $t_4$). As a result, the UT would not transmit the RTX data until much later, at time $t_9$ (e.g., corresponding to the maximum HARQ RTT). By implementing a dynamic HARQ RTT in the manner described with respect to FIG. 10A, the SAN (e.g., and UT) may significantly reduce the latency of retransmissions on the reverse link of the satellite communication system. More specifically, by including the HARQ timing information in individual RL grants, the SAN may dynamically adjust the HARQ timeline for RL HARQ processes with finer granularity (e.g., since the HARQ timeline may be updated, based on the current feeder-link delay, for each RL grant communicated to the UT by the SAN).

Figure 10B:
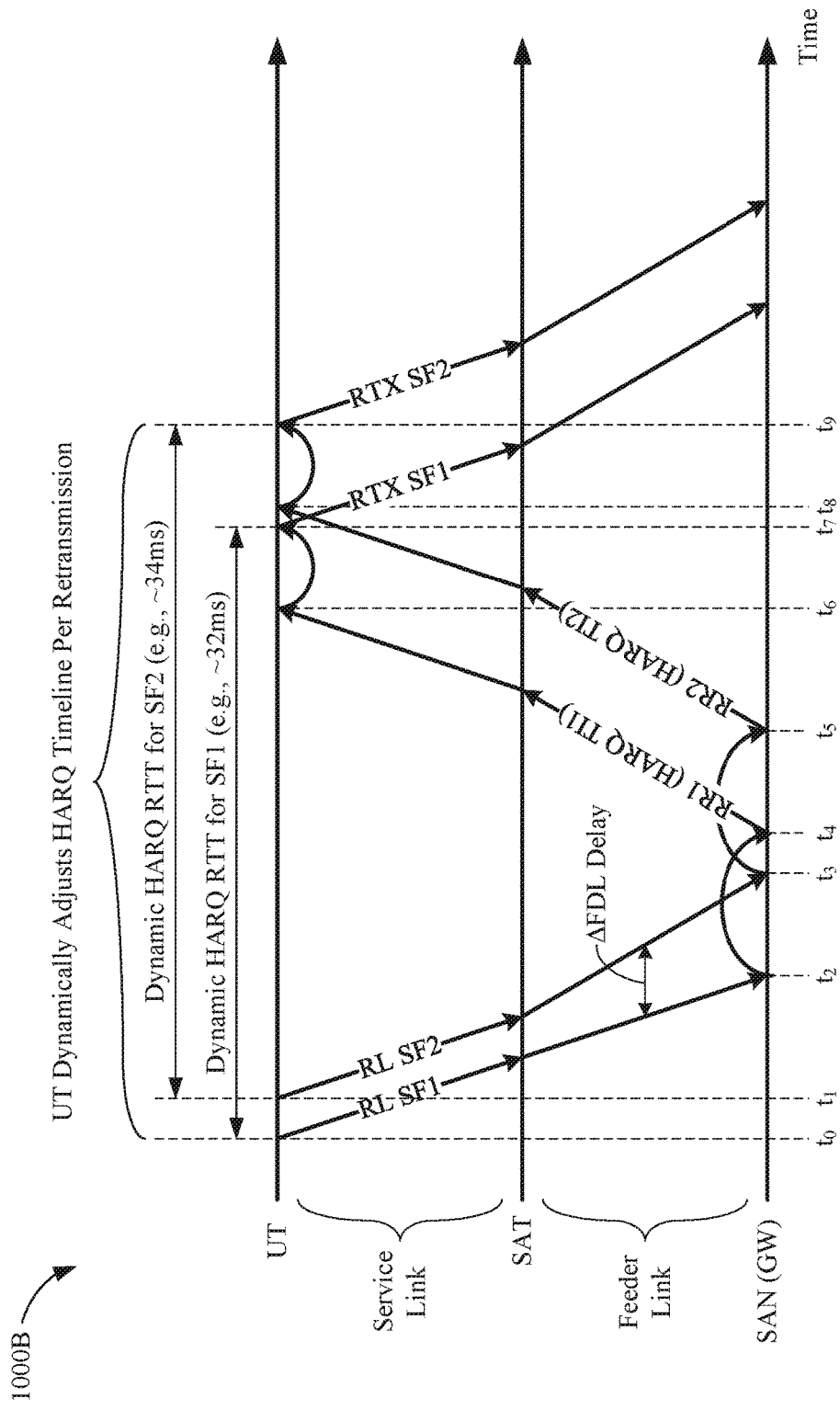
FIG. 10B shows an example timing diagram depicting an RL HARQ process with a configurable timeline that may be dynamically adjusted per retransmission.

Retransmission requests are typically provided with RL grants (e.g., to allocate resources on the reverse link for the RTX data). Thus, in some aspects, the SAN may communicate updated HARQ timing information with each retransmission request sent to the UT. For example, with reference to timing diagram 1000B of FIG. 10B, the UT may send a series of consecutive RL subframes to the SAN. Specifically, the UT may transmit a first RL subframe (RL SF1) at time to and a second RL subframe (RL SF2) at time $t_1$. The SAT receives the RL subframes via the service link and relays the communications to the SAN via the feeder link. Due to delays in the feeder link and service link, the SAN receives the first RL subframe at time $t_2$ and the second RL subframe at time $t_3$. In the example of FIG. 10B, the feeder-link delay changes (e.g., increases) from the time the SAT relays the first RL subframe to the time the SAT relays the second RL subframe. As a result, the delay between the reception of the two RL subframes by the SAN (e.g., from times $t_2$ to $t_3$) is greater than the delay between the transmission of the two RL subframes by the UT (e.g., from times $t_0$ to $t_1$).

The SAN checks the first RL subframe, from times $t_2$ to $t_4$, to determine whether the first RL subframe is received correctly (e.g., and to fix any correctable errors in the received RL data). Then, at time $t_4$, the SAN may send a first retransmission request (RR1) to the UT to request retransmission of first RL subframe. Further, the SAN checks the second RL subframe, from times $t_3$ to $t_5$, to determine whether the second RL subframe is receive correctly (e.g., and to fix any correctable errors in the received RL data). Then, at time $t_5$, the SAN may send a second retransmission request (RR2) to the UT to request retransmission of the second RL subframe. In example implementations, each of the retransmission requests RR1 and RR2 may include HARQ timing information that may be used to dynamically configure or adjust a HARQ timeline implemented by the UT for a respective RL subframe (e.g., RL SF1 and RL SF2, respectively).

As described above with respect to FIG. 10A, the HARQ timing information may be included in an RL grant message provided with each retransmission request. For example, the first retransmission request RR1 may include a first set of HARQ timing information (HARQ TI1) to be used for synchronizing the first retransmission request RR1 with an RL HARQ process associated with the first RL subframe (e.g., which is transmitted at time to). The second retransmission request RR2 may include a second set of HARQ timing information (HARQ TI2) to be used for synchronizing the second retransmission request RR2 with an RL HARQ process associated with the second RL subframe (e.g., which is transmitting at time $t_1$).

For some implementations, the HARQ timing information may include a dynamic HARQ RTT to be implemented by the UT for the associated retransmission request. For example, the first set of HARQ timing information may include the dynamic HARQ RTT (~32 ms) to be implemented for processing retransmissions of the first RL subframe, and the second set of HARQ timing information may include the dynamic HARQ RTT (~34 ms) to be implemented for processing retransmissions of the second RL subframe. In other implementations, the HARQ timing information may include a HARQ process ID for the RL HARQ process associated with requested data. For example, the first set of HARQ timing information may include HARQ process ID associated with the first RL subframe, and the second set of HARQ timing information may include the HARQ process ID associated with the second RL subframe.

The SAT receives the retransmission requests RR1 and RR2 via the feeder link and relays the respective messages to the UT via the service link. Due to delays in the feeder link and service link, the UT receives the first retransmission request at time $t_6$ and the second retransmission request at time $t_8$. Due to the change in feeder link delay between the reception of the first RL subframe and the reception of the second RL subframe (e.g., from times $t_2$ to $t_3$), the UT may receive the first retransmission request (e.g., at time $t_6$) much sooner than it receives the second retransmission request (e.g., at time $t_8$). Thus, in example implementations, the UT may use the respective HARQ timing information included in each retransmission request to synchronize the particular retransmission request with a corresponding RL HARQ process.

In some aspects, the UT may use a dynamic HARQ RTT included in the first retransmission request to determine that the retransmission request received at time $t_6$ is for RL data previously transmitted at time $t_0$. Similarly, the UT may use a dynamic HARQ RTT included in the second retransmission request to determine that the retransmission request received at time $t_8$ is for RL data previously transmitted at time $t_1$. In other aspects, the UT may use a HARQ process ID included in the first retransmission request to identify the RL HARQ process associated with the first RL subframe. Similarly, the UT may use a HARQ process ID included in the second retransmission request to identify the RL HARQ process associated with the second RL subframe.

The UT may then process the first retransmission request, from times $t_6$ to $t_7$, and retransmit the first RL subframe (e.g., as RTX SF1) to the SAN at time $t_7$. The UT may further process the second retransmission request, from times $t_8$ to $t_9$, and retransmit the second RL subframe (e.g., as RTX SF2) to the SAN at time $t_9$. By implementing a dynamic HARQ RTT in the manner described with respect to FIG. 10B, the SAN (e.g., and UT) may adjust the latency of retransmissions on the reverse link of the satellite communication system in response to instantaneous changes in feeder-link delay. More specifically, the SAN may dynamically adjust the HARQ timeline for RL HARQ processes on a per-subframe basis (e.g., based on the current feeder-link delay).

Figure 11:
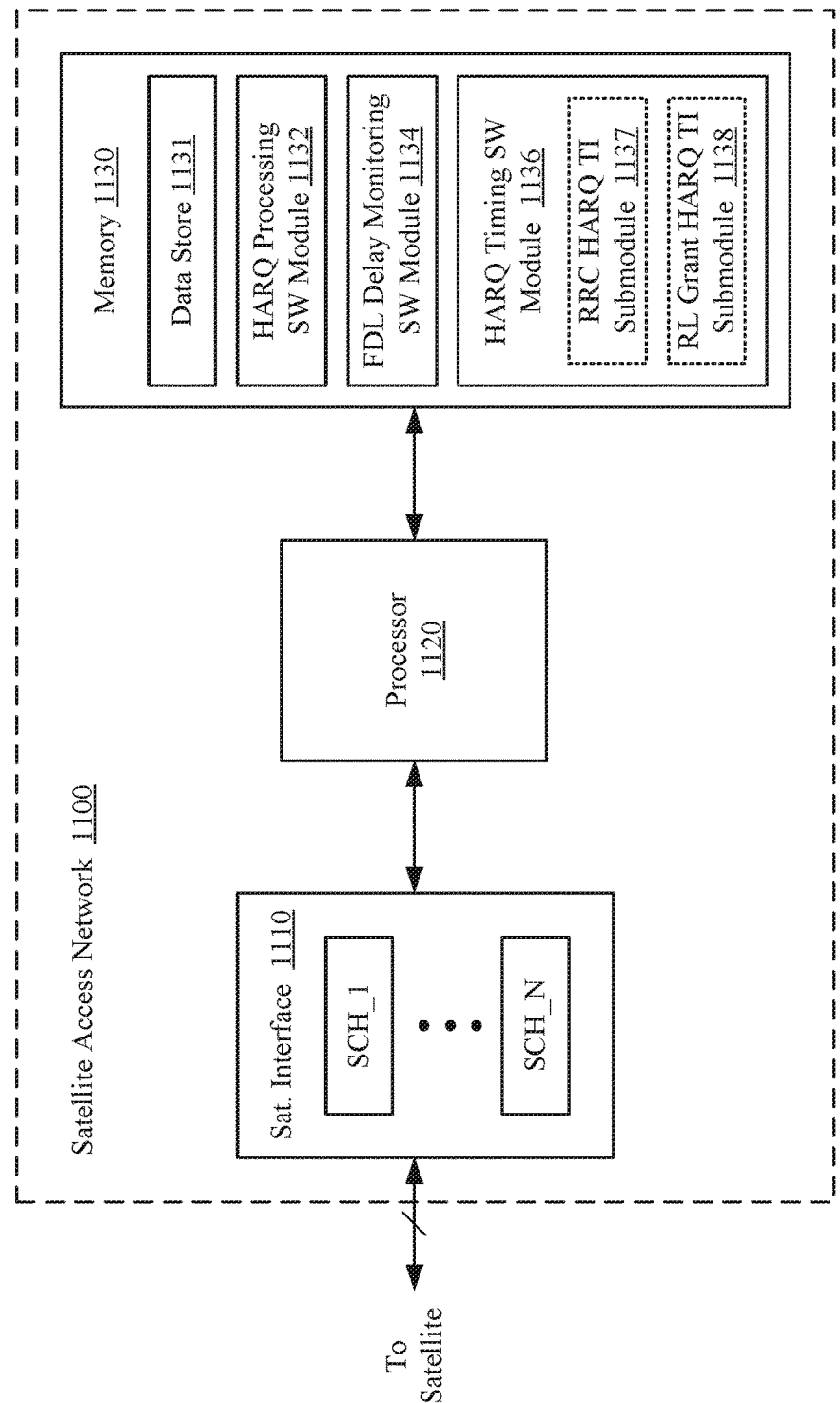
FIG. 11 shows a block diagram of an example satellite access network (SAN) in accordance with example implementations.

FIG. 11 is a block diagram of an example satellite access network (SAN) 1100 in accordance with example implementations. For purposes of discussion herein, the SAN 1100 may be an example of (or implemented within) the SAN 150 of FIG. 1. The SAN 1100 includes a satellite interface 1110, a processor 1120, and memory 1130. The satellite interface 1110 may be configured to communicate with a particular satellite (e.g., satellite 300 of FIG. 1). Furthermore, the satellite interface 1110 may include a number of schedulers SCH_1-SCH_N that control and/or schedule communications via one or more gateways (e.g., as described above with respect to FIG. 7). For some implementations, the SAN 1100 may include other circuitry and/or components in addition to those shown in FIG. 11.

Memory 1130 includes a data store 1131 that may store incoming data received from a user terminal via a reverse link of a satellite communication system. The incoming data may be associated with ongoing HARQ processes maintained by one or more of the schedulers SCH_1-SCH_N. The memory 1130 may also include a non-transitory computer-readable storage medium (e.g., one or more nonvolatile memory elements, such as EPROM, EEPROM, Flash memory, a hard drive, and so on) that may store the following software (SW) modules:

- a HARQ processing SW module 1132 to generate HARQ feedback information (e.g., ACK or NACK) and/or retransmission requests for the incoming data stored in the data store 1131;
- a feeder-link delay (FDL) monitoring SW module 1134 to monitor a respective feeder-link delay observed by one or more gateways (not shown for simplicity) of the SAN; and
- a HARQ timing SW module 1136 to dynamically configure a timeline for processing retransmission requests of the incoming data based at least in part on an amount of feeder-link delay between a satellite and a corresponding gateway that received the incoming data, the HARQ timing SW module 1136 including:
    - a radio resource control (RRC) HARQ timing information (TI) submodule 1137 to control and/or adjust a timing of retransmissions, by a user terminal, using RRC configuration messages; and
    - an RL grant HARQ TI submodule 1138 to control and/or adjust a timing of retransmissions, by a user terminal, using RL grant messages.

Each software module includes instructions that, when executed by processor 1120, cause the SAN 1100 to perform the corresponding functions. The non-transitory computer-readable medium of memory 1130 thus includes instructions for performing all or a portion of the operations of FIGS. 13 and 14.

Processor 1120 may be any suitable one or more processors capable of executing scripts or instructions of one or more software programs stored in the SAN 1100 (e.g., within memory 1130). For example, processor 1120 may execute HARQ processing SW module 1132 to generate HARQ feedback information (e.g., ACK or NACK) and/or retransmission requests for the incoming data stored in the data store 1131. Processor 1120 may also execute the FDL monitoring SW module 1134 to monitor a respective feeder-link delay observed by one or more gateways of the SAN. Still further, processor 1120 may execute the HARQ timing SW module 1136 to dynamically configure a timeline for processing retransmission requests of the incoming data based at least in part on an amount of feeder-link delay between a satellite and a corresponding gateway that received the incoming data.

In executing the HARQ timing SW module 1136, the processor 1120 may further execute the RRC HARQ TI submodule 1137 and/or the RLG HARQ TI submodule 1138. For example, the processor 1120 may execute the RRC HARQ TI submodule 1137 to control and/or adjust a timing of retransmissions, by a user terminal, using RRC configuration messages. The processor 1020 may execute the RLG HARQ TI submodule 1138 to control and/or adjust a timing of retransmissions, by a user terminal, using RL grant messages. For at least some implementations, the functions performed by executing the HARQ timing SW module 1136, the RRC HARQ TI submodule 1137, and/or the RLG HARQ TI submodule 1138 may correspond to and/or may be performed by the HARQ RTT logic 152 of FIG. 1.

Figure 12:
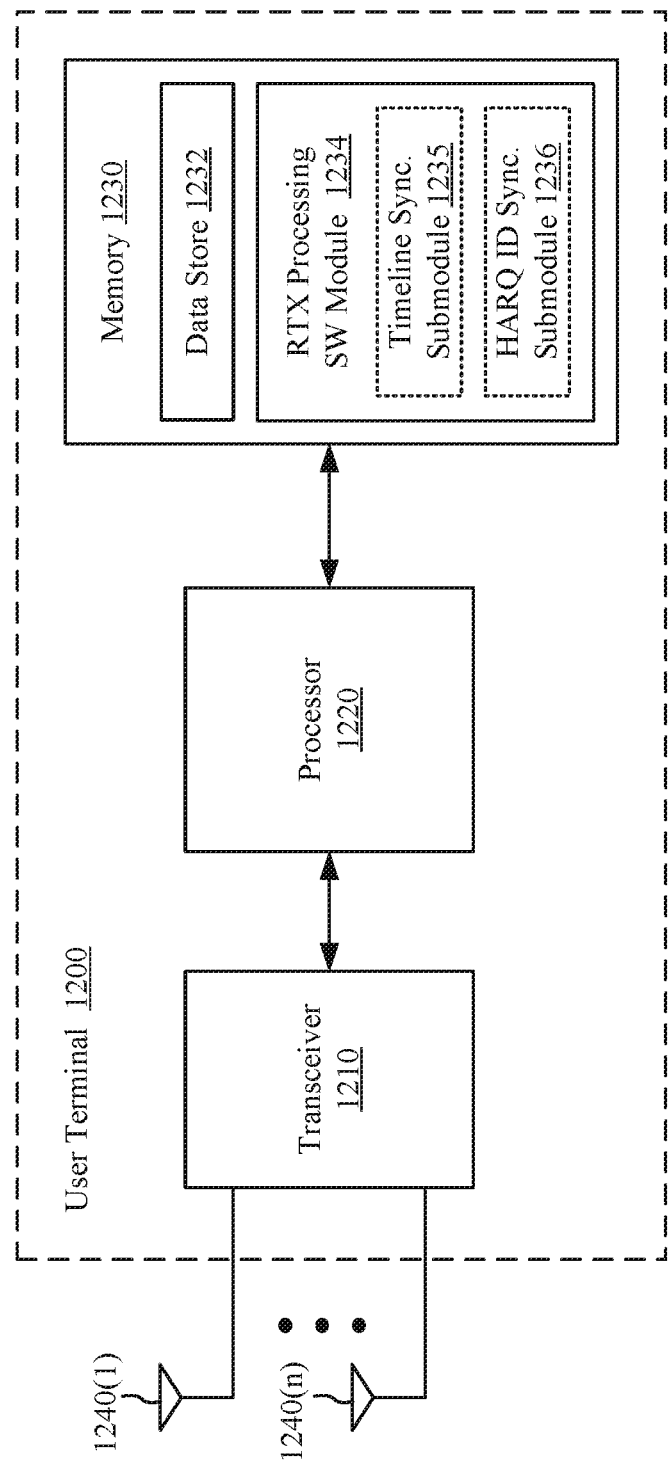
FIG. 12 shows a block diagram of an example user terminal in accordance with some implementations.

FIG. 12 shows a block diagram of an example user terminal 1200 in accordance with some implementations. The user terminal 1200 may be one implementation of any of the UTs 400 and/or 401 of FIGS. 1 and 4. The user terminal 1200 includes a transceiver 1210, a processor 1220, a memory 1230, and one or more antennas 1240(1)-1240(n). The transceiver 1210 may be used to transmit signals to and receive signals from satellites, UEs, and/or other suitable wireless devices. In some aspects, the transceiver 1210 may include any number of transceiver chains (not shown for simplicity) that may be coupled to any suitable number of antennas 1240(1)-1240(n). Although not shown in FIG. 12 for simplicity, the user terminal 1200 may include antenna selection logic to selectively couple the transceiver chains of transceiver 1210 to antennas 1240(1)-1240(n).

Memory 1230 includes a data store 1232 that may store outgoing data to be transmitted to a SAN via a reverse link of a satellite communication system. The outgoing data may be associated with ongoing HARQ processes maintained by the SAN (e.g., by one or more of the schedulers SCH_1-SCH_N of FIG. 11). Thus, at least some of the outgoing data stored in the data store 1232 may be requested for retransmission. The memory 1230 may also include a non-transitory computer-readable medium (e.g., one or more nonvolatile memory elements, such as EPROM, EEPROM, Flash memory, a hard drive, etc.) that may store at least the following software (SW) modules:
  a retransmission (RTX) processing SW module 1234 to process retransmission requests received from a SAN, and to retransmit the requested data to the SAN, the RTX SW module 1234 including:
    a timeline synchronization submodule 1235 to identify the requested data based at least in part on a dynamic HARQ RTT associated with the retransmission request; and
    a HARQ ID synchronization submodule 1236 to identify the requested data based at least in part on a HARQ process ID associated with the retransmission request.
Each software module includes instructions that, when executed by processor 1220, cause the user terminal 1200 to perform the corresponding functions. The non-transitory computer-readable medium of memory 1230 thus includes instructions for performing all or a portion of the operations of FIG. 15.

Processor 1220 may be any suitable one or more processors capable of executing scripts or instructions of one or more software programs stored in the user terminal 1200 (e.g., within memory 1230). For example, processor 1220 may execute the RTX processing SW module 1234 to process retransmission requests received form a SAN, and to retransmit the requested data to the SAN. In executing the RTX processing SW module 1234, the processor 1120 may further execute the timeline synchronization submodule 1235 and/or the HARQ ID synchronization submodule 1236. For example, the processor 1220 may execute the timeline synchronization submodule 1235 to identify the requested data based at least in part on a dynamic HARQ RTT associated with the retransmission request. The processor 1220 may execute the HARQ ID synchronization submodule 1236 to identify the requested data based at least in part on a HARQ process ID associated with the retransmission request. For at least some implementations, the functions performed by executing the RTX processing SW module 1234, the timeline synchronization submodule 1235, and/or the HARQ ID synchronization submodule 1236 may correspond to and/or may be performed by the dynamic RTX logic 425 of FIGS. 1 and 4.

Figure 13:
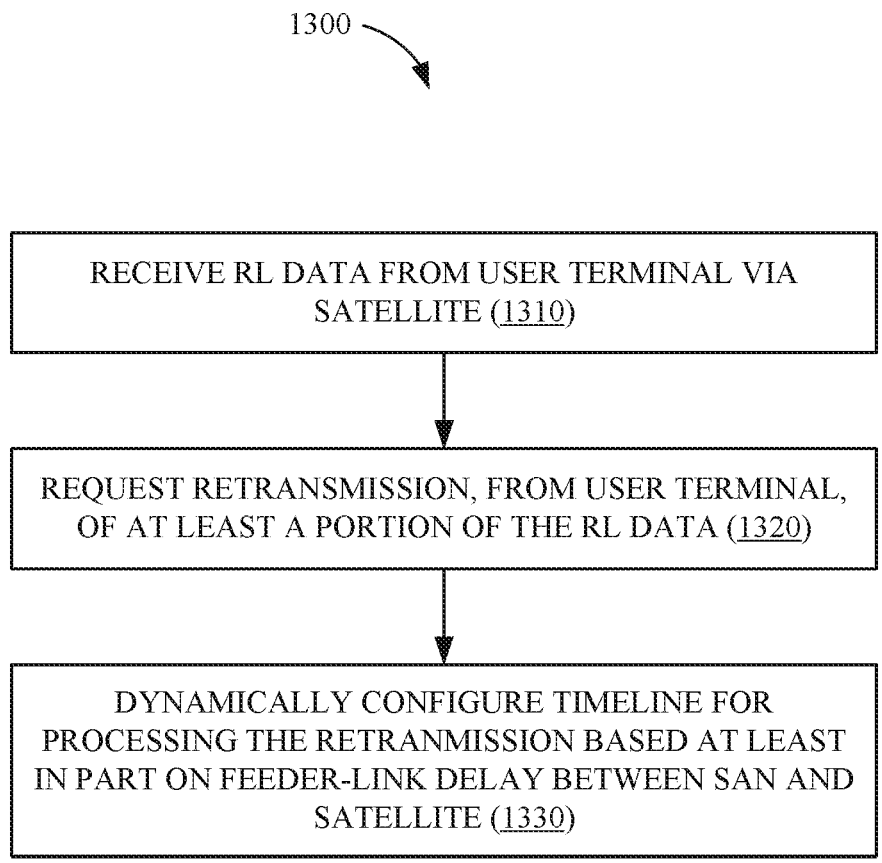
FIG. 13 shows an illustrative flowchart depicting an example HARQ operation with a dynamically configurable timeline.

FIG. 13 shows an illustrative flowchart depicting an example HARQ operation 1300 with a dynamically configurable timeline. The example operation 1300 may be performed by the SAN 1100 depicted in FIG. 11. However, it is to be understood that operation 1300 may be performed by other suitable SANs and/or by any suitable components of the SAN 150 of FIG. 1.

First, the SAN 1100 may receive RL data from a user terminal via a satellite of a satellite communication system (1310). For example, the user terminal may transmit the RL data via a service link of the satellite. The satellite may then relay the RL data to the SAN 1100 via a feeder link. As described above with respect to FIGS. 7 and 8, the amount of signal propagation delay in the feeder link may vary over time. Moreover, the relative timing offset between the reception of the RL data (e.g., by the SAN 1100) and the transmission of the RL data (e.g., by the user terminal) may depend on the actual feeder-link delay in the satellite communication system at any given time.

The SAN 1100 may then request transmission, from the user terminal, of at least a portion of the RL data (1320). For example, the SAN 1100 may check the received RL data (e.g., based on CRC and/or FEC information) to determine whether the RL data is received correctly and/or to fix any correctable errors in the received RL data. Upon determining that the RL data contains one or more uncorrectable errors, the SAN 1100 may send a retransmission request to the user terminal for at least a portion of the RL data. For example, the retransmission request may be a negative acknowledgement (NACK) message. In example implementations, the SAN 1100 may initiate or send the retransmission request to the user terminal immediately after receiving the RL data and determining that the RL data contains errors.

Furthermore, the SAN 1100 may dynamically configure a timeline for processing the transmission based at least in part on a feeder-link delay between the SAN 1100 and the satellite (1330). As described above, the relative timing offset between the reception of the RL data and the transmission of the RL data may vary depending on the actual feeder-link delay in the satellite communication system at any given time. Nonetheless, the SAN 1100 may initiate a retransmission request immediate after receiving the RL data (e.g., and determining that the RL data is received with errors) regardless of the actual feeder-link delay. As described above with respect to FIGS. 8-10B, this may reduce the latency of retransmission requests whenever the actual feeder-link delay is less than the maximum amount.

To account for variations in the timing of retransmission requests, the SAN 1100 may instruct the user terminal to implement a dynamic HARQ RTT for processing retransmission requests received from the SAN. For example, the dynamic HARQ RTT may be any length of time between a minimum HARQ RTT and a maximum HARQ RTT (inclusive), depending on the actual feeder-link delay observed by the SAN (e.g., or corresponding gateway). By implementing a dynamic HARQ RTT, the user terminal may dynamically adjust (e.g., reduce) the latency of retransmissions on the reverse link while maintaining synchronization between received retransmission requests and their associated HARQ processes (e.g., corresponding to the originally-transmitted RL data).

Figure 14:
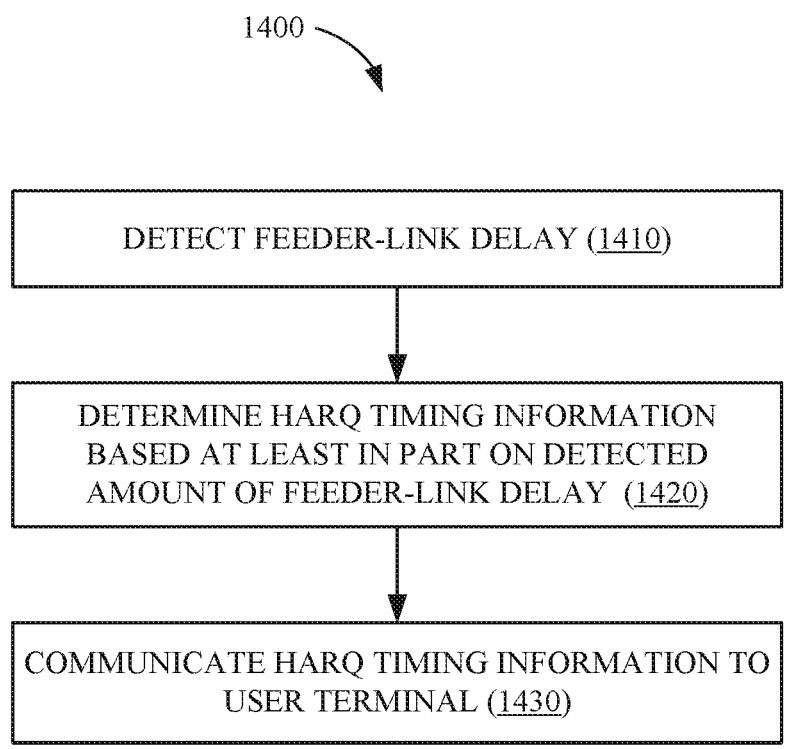
FIG. 14 shows an illustrative flowchart depicting an example operation for dynamically configuring a timeline for processing retransmissions from a user terminal to a SAN.

FIG. 14 shows an illustrative flowchart depicting an example operation 1400 for dynamically configuring a timeline for processing retransmissions from a user terminal to a SAN. The example operation 1400 may be performed by the SAN 1100 depicted in FIG. 11. However, it is to be understood that operation 1400 may be performed by other suitable SANs and/or by any suitable components of the SAN 150 of FIG. 1.

First, the SAN 1100 may detect an amount of feeder-link delay between a satellite of the satellite communications system and a corresponding gateway (1310). For example, each gateway of the SAN may be configured to continuously monitor its respective feeder-link delay. Accordingly, the SAN 1100 may keep track of the feeder-link delay for each of its gateways, at any given time. As described above, the feeder-link delay may affect the timing of communications between the SAN 1100 and a particular user terminal. More specifically, the feeder-link delay may affect a timeline or schedule for which the user terminal is able to receive and/or process retransmission requests initiated by the SAN 1100.

The SAN 1100 may then determine HARQ timing information based at least in part on the detected amount of feeder-link delay (1420). The HARQ timing information may enable the user terminal to dynamically synchronize retransmission requests, received from the SAN 1100, with associated RL HARQ processes (e.g., even when the retransmission requests are received with varying amounts of feeder-link delay). For some implementations, the HARQ timing information may include a dynamic HARQ RTT to be implemented by the user terminal for processing retransmission requests (e.g., as described above with respect to FIGS. 9-10B). In other implementations, the HARQ timing information may include a HARQ process ID for the RL HARQ process associated with the requested data (e.g., as described above with respect to FIGS. 10A-10B).

Thereafter, the SAN 1100 may communicate the HARQ timing information to the user terminal (1430). For some implementations, the HARQ timing information may be included in an RRC configuration message. For example, as described above with respect to FIG. 9, the SAN 1100 may periodically transmit RRC configuration messages to the user terminal to reconfigure and/or re-establish communications with the user terminal during inter-beam handovers. By including the HARQ timing information in RRC configuration messages, the SAN 1100 may dynamically adjust the HARQ timeline for RL HARQ processes with minimal additional overhead.

In other implementations, the HARQ timing information may be included in an RL grant message. For example, as described above with respect to FIGS. 10A-10B, the SAN 1100 may include an RL grant message with each retransmission request sent to the user terminal (e.g., to allocate resources on the reverse link for data to be retransmitted). By including the HARQ timing information in individual retransmission requests (and/or RL grants), the SAN may dynamically adjust the HARQ timeline for RL HARQ processes with finer granularity. More specifically, this may enable the SAN to dynamically adjust the HARQ timeline for RL HARQ processes on a per-subframe basis (e.g., based on the current feeder-link delay).

Figure 15:
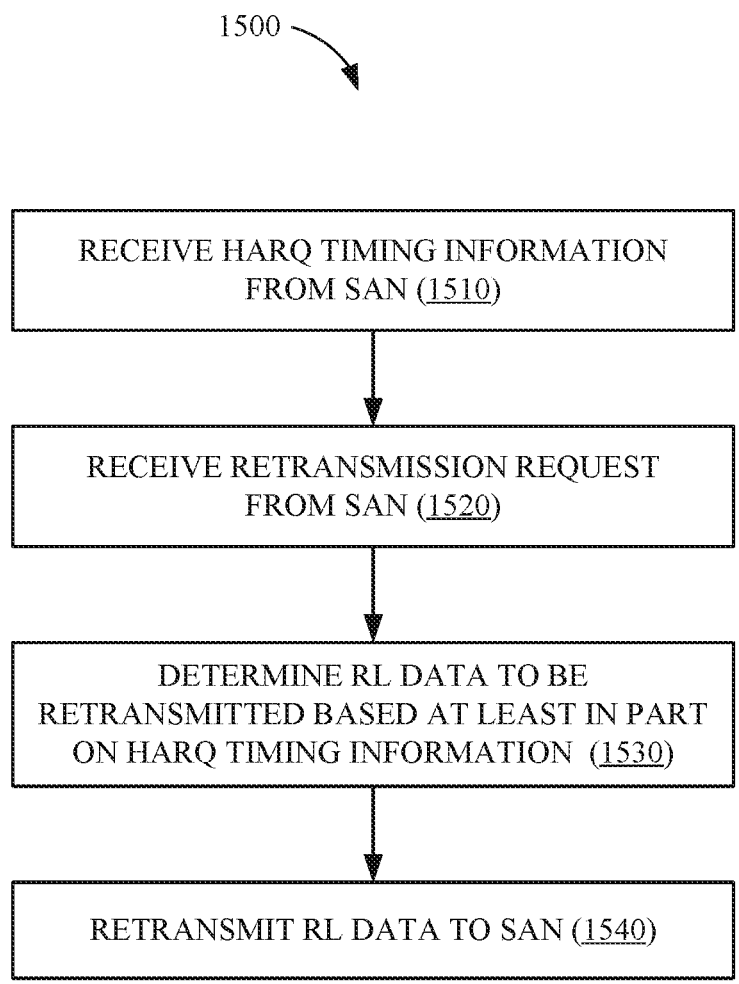
FIG. 15 shows an illustrative flowchart depicting an example operation for synchronizing retransmission requests with RL HARQ processes based on timing information received from a'.

FIG. 15 shows an illustrative flowchart depicting an example operation 1500 for synchronizing retransmission requests with RL HARQ processes based on timing information received from a SAN. The example operation 1500 may be performed by the user terminal 1200 depicted in FIG. 12. However, it is to be understood that operation 1500 may be performed by other suitable devices capable of initiating reverse-link communications with a SAN via the satellite 300 of FIG. 1.

First, the user terminal 1200 may receive HARQ timing information (1510) and a retransmission request (1520) from a SAN. The HARQ timing information may enable the user terminal to dynamically synchronize the received retransmission request with an associated RL HARQ process (e.g., based on an amount of feeder-link delay experienced by the user terminal 1200). In some aspects, the HARQ timing information may be included in the retransmission request and/or an RL grant message provided with the retransmission request (e.g., as described above with respect to FIGS. 10A-10B). In other aspects, the HARQ timing information may be received via an RRC configuration message sent prior to the retransmission request (e.g., as described above with respect to FIG. 9).

The user terminal 1200 may then determine RL data to be retransmitted to the SAN based at least in part on the HARQ timing information (1530). In some aspects, the HARQ timing information may include a dynamic HARQ RTT to be implemented by the user terminal 1200 for processing the retransmission request. For such implementations, the user terminal 1200 may use the dynamic HARQ RTT (e.g., after factoring in its own processing time) to determine the time at which the requested RL data was initially transmitted. In other aspects, the HARQ timing information may include a HARQ process ID for the RL HARQ process associated with the requested data. For such implementations, the user terminal 1200 may use the HARQ process ID to identify the RL HARQ process to which the requested data belongs.

Thereafter, the user terminal 1200 may retransmit the requested RL data to the SAN (1540). More specifically, the timing of the retransmission (e.g., relative to the original transmission) may vary depending on the amount of feeder-link delay experienced by the user terminal 1200. In comparison with a conventional (e.g., fixed or static) HARQ timeline, the example implementations may significantly reduce the latency of retransmissions on the reverse link of the satellite communication system (e.g., whenever the actual feeder-link delay is less than the maximum feeder-link delay).

Figure 16:
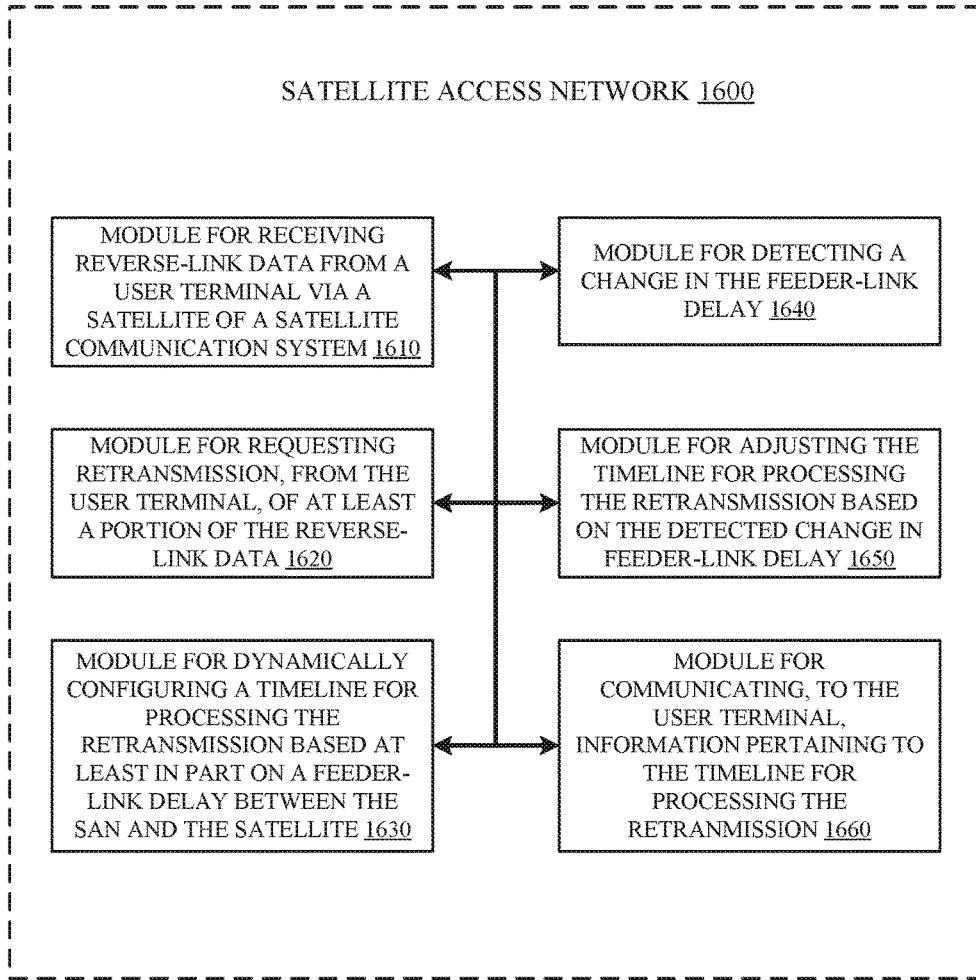
FIG. 16 shows an example satellite access network represented as a series of interrelated functional modules.

FIG. 16 shows an example satellite access network 1600 represented as a series of interrelated functional modules. A module 1610 for receiving reverse-link data from a user terminal via a satellite of a satellite communication system may correspond at least in some aspects to, for example, a processor as discussed herein (e.g., processor 1120) and/to a scheduler as discussed herein (e.g., one of schedulers SCH_1-SCH_N). A module 1620 for requesting retransmission, from the user terminal, of at least a portion of the reverse-link data may correspond at least in some aspects to, for example, a processor as discussed herein (e.g., processor 1120) and/to a scheduler as discussed herein (e.g., one of schedulers SCH_1-SCH_N). A module 1630 for dynamically configuring a timeline for processing the retransmission based at least in part on a feeder-link delay between the SAN 1600 and the satellite may correspond at least in some aspects to, for example, a processor as discussed herein (e.g., processor 1120) and/to a scheduler as discussed herein (e.g., one of schedulers SCH_1-SCH_N).

A module 1640 for detecting a change in the feeder-link delay may correspond at least in some aspects to, for example, a processor as discussed herein (e.g., processor 1120) and/to a scheduler as discussed herein (e.g., one of schedulers SCH_1-SCH_N). A module 1650 for adjusting the timeline for processing the transmission based on the detected change in feeder-link delay may correspond at least in some aspects to, for example, a processor as discussed herein (e.g., processor 1120) and/to a scheduler as discussed herein (e.g., one of schedulers SCH_1-SCH_N). A module 1660 for communicating, to the user terminal, information pertaining to the timeline for processing the retransmission may correspond at least in some aspects to, for example, a processor as discussed herein (e.g., processor 1120) and/to a scheduler as discussed herein (e.g., one of schedulers SCH_1-SCH_N).

Figure 17:
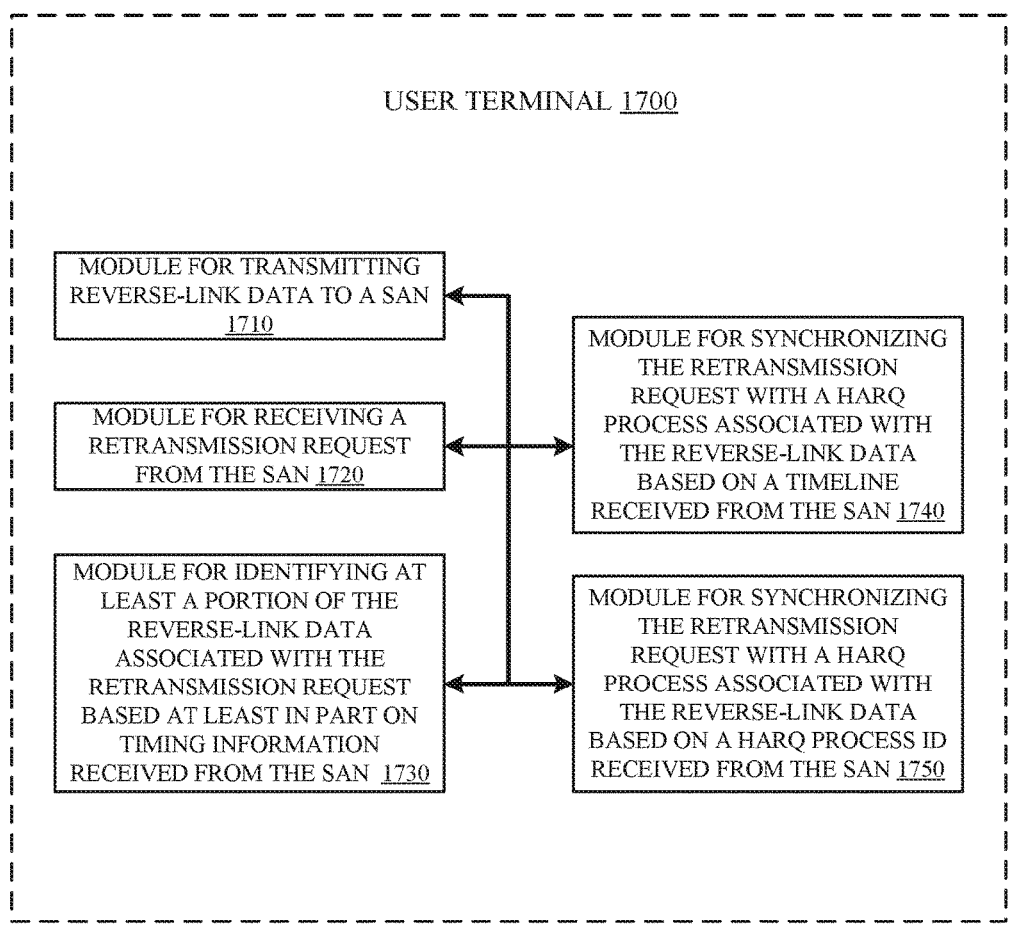
FIG. 17 shows an example user terminal represented as a series of interrelated functional modules.

FIG. 17 shows an example user terminal 1700 represented as a series of interrelated functional modules. A module 1710 for transmitting reverse-link data to a SAN may correspond at least in some aspects to, for example, a processor as discussed herein (e.g., processor 1220) and/to a transceiver as discussed herein (e.g., transceiver 1210). A module 1720 for receiving a retransmission request from the SAN may correspond at least in some aspects to, for example, a processor as discussed herein (e.g., processor 1220) and/to a transceiver as discussed herein (e.g., transceiver 1210). A module 1730 for identifying at least a portion of the reverse-link data associated with the retransmission request based at least in part on timing information received from the SAN may correspond at least in some aspects to, for example, a processor as discussed herein (e.g., processor 1220).

A module 1740 for synchronizing the retransmission request with a HARQ process associated with the reverse-link data based on a timeline received from the SAN may correspond at least in some aspects to, for example, a processor as discussed herein (e.g., processor 1220). A module 1750 for synchronizing the retransmission request with a HARQ process associated with the reverse-link data based on a HARQ process ID received from the SAN may correspond at least in some aspects to, for example, a processor as discussed herein (e.g., processor 1220).

The functionality of the modules of FIGS. 16 and 17 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 16 and 17, as well as other components and functions described herein, may be implemented using any suitable means. Such means also may be implemented, at least in part, using corresponding structure as taught herein. For example, the components described above in conjunction with the "module for" components of FIGS. 16 and 17 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, one aspect of the disclosure can include a non-transitory computer readable media embodying a method for time and frequency synchronization in non-geosynchronous satellite communication systems. The term "non-transitory" does not exclude any physical storage medium or memory and particularly does not exclude dynamic memory (e.g., conventional random access memory (RAM)) but rather excludes only the interpretation that the medium can be construed as a transitory propagating signal.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A method of operating a satellite access network (SAN) of a satellite communication system, the method comprising:

receiving reverse-link (RL) data from a user terminal via a satellite of the satellite communication system;

dynamically configuring a timeline for processing retransmissions based at least in part on changes in an amount of feeder-link delay between the SAN and the satellite, wherein the timeline includes a timing of retransmission requests initiated by the SAN and a timing of retransmissions initiated by the user terminal in response to the retransmission requests; and transmitting a retransmission request to the user terminal for at least a portion of the RL data in accordance with the timeline.

2. The method of claim 1, wherein the timeline is used by the user terminal to synchronize the retransmission request with a hybrid automatic repeat request (HARQ) process associated with the portion of RL data.

3. The method of claim 1, wherein the dynamically configuring comprises:

detecting a change in the feeder-link delay; and adjusting the timeline for processing retransmissions based on the detected change in feeder-link delay.

4. The method of claim 1, wherein the dynamically configuring comprises:

communicating, to the user terminal, information pertaining to the timeline for processing retransmissions.

5. The method of claim 4, wherein the information includes an amount of delay to be implemented by the user terminal between the transmission and retransmission of the portion of RL data.

6. The method of claim 4, wherein the information is provided in an RL grant message communicated to the user terminal.

7. The method of claim 4, wherein the information is provided in a radio resource control (RRC) configuration message communicated to the user terminal during an inter-beam handover.

8. The method of claim 4, wherein the information includes a HARQ process identifier associated with the portion of RL data.

9. The method of claim 8, wherein the information is provided in a retransmission request communicated to the user terminal for the corresponding portion of RL data.

10. A satellite access network (SAN) comprising:

one or more processors; and a memory configured to store instructions that, when executed by the one or more processors, cause the SAN to:

receive reverse-link (RL) data from a user terminal via a satellite of a satellite communication system;

dynamically configure a timeline for processing retransmissions based at least in part on changes in an amount of feeder-link delay between the SAN and the satellite, wherein the timeline includes a timing of retransmission requests initiated by the SAN and a timing of retransmissions initiated by the user terminal in response to the retransmission requests; and transmit a retransmission request to the user terminal for at least a portion of the RL data in accordance with the timeline.

11. The satellite access network of claim 10, wherein the timeline is used by the user terminal to synchronize the retransmission request with a hybrid automatic repeat request (HARQ) process associated with the portion of RL data.

12. The satellite access network of claim 10, wherein execution of the instructions to dynamically configure the timeline causes the SAN to:

detect a change in the feeder-link delay; and adjust the timeline for processing retransmissions based on the detected change in feeder-link delay.

13. The satellite access network of claim 10, wherein execution of the instructions to dynamically configure the timeline causes the SAN to:

communicate, to the user terminal, information pertaining to the timeline for processing retransmissions.

14. The satellite access network of claim 13, wherein the information includes an amount of delay to be implemented by the user terminal between the transmission and retransmission of the portion of RL data, and wherein the information is provided in at least one of an RL grant message communicated to the user terminal or a radio resource control (RRC) configuration message communicated to the user terminal during an inter-beam handover.

15. The satellite access network of claim 13, wherein the information includes a HARQ process identifier associated with the portion of RL data, and wherein the information is provided in a retransmission request communicated to the user terminal for the corresponding portion of RL data.

16. A satellite access network (SAN) comprising:

means for receiving reverse-link (RL) data from a user terminal via a satellite of a satellite communication system;

means for dynamically configuring a timeline for processing the retransmission based at least in part on changes in an amount of feeder-link delay between the SAN and the satellite, wherein the timeline includes a timing of retransmission requests initiated by the SAN and a timing of retransmissions initiated by the user terminal in response to the retransmission requests; and means for transmitting a retransmission request to the user terminal for at least a portion of the RL data in accordance with the timeline.

17. The satellite access network of claim 16, wherein the timeline is used by the user terminal to synchronize the retransmission request with a hybrid automatic repeat request (HARQ) process associated with the portion of RL data.

18. The satellite access network of claim 16, wherein the means for dynamically configuring comprises:

means for detecting a change in the feeder-link delay; and means for adjusting the timeline for processing retransmissions based on the detected change in feeder-link delay.

19. The satellite access network of claim 16, wherein the means for dynamically configuring comprises:

means for communicating, to the user terminal, information pertaining to the timeline for processing retransmissions.

20. The satellite access network of claim 19, wherein the information includes an amount of delay to be implemented by the user terminal between the transmission and retransmission of the portion of RL data, and wherein the information is provided in at least one of an RL grant message communicated to the user terminal or a radio resource control (RRC) configuration message communicated to the user terminal during an inter-beam handover.

21. The satellite access network of claim 19, wherein the information includes a HARQ process identifier associated with the portion of RL data, and wherein the information is provided in a retransmission request communicated to the user terminal for the corresponding portion of RL data.

22. A non-transitory computer-readable medium storing instructions that, when executed by one or more processors of a satellite access network (SAN), cause the SAN to perform operations comprising:
    receiving reverse-link (RL) data from a user terminal via a satellite of a satellite communication system;
    dynamically configuring a timeline for processing retransmissions based at least in part on changes in an amount of feeder-link delay, wherein the timeline includes a timing of retransmission requests initiated by the SAN and a timing of retransmissions initiated by the user terminal in response to the retransmission requests; and
    transmitting a retransmission request to the user terminal for at least a portion of the RL data in accordance with the timeline.

23. The non-transitory computer-readable medium of claim 22, wherein the timeline is used by the user terminal to synchronize the retransmission request with a hybrid automatic repeat request (HARQ) process associated with the portion of RL data.

24. The non-transitory computer-readable medium of claim 22, wherein execution of the instructions for dynamically configuring the timeline causes the SAN to:
    detect a change in the feeder-link delay; and
    adjust the timeline for processing retransmissions based on the detected change in feeder-link delay.

25. The non-transitory computer-readable medium of claim 22, wherein execution of the instructions for dynamically configuring the timeline causes the SAN to:
    communicate, to the user terminal, information pertaining to the timeline for processing retransmissions.

26. The non-transitory computer-readable medium of claim 25, wherein the information includes an amount of delay to be implemented by the user terminal between the transmission and retransmission of the portion of RL data, and wherein the information is provided in at least one of an RL grant message communicated to the user terminal or a radio resource control (RRC) configuration message communicated to the user terminal during an inter-beam handover.

27. The non-transitory computer-readable medium of claim 25, wherein the information includes a HARQ process identifier associated with the portion of RL data, and wherein the information is provided in a retransmission request communicated to the user terminal for the corresponding portion of RL data.

* * * * *